United States Patent
Huber et al.

(10) Patent No.: US 7,908,210 B2
(45) Date of Patent: Mar. 15, 2011

(54) SYSTEMS AND METHOD FOR MANAGING DEALER INFORMATION

(75) Inventors: David Lynn Huber, Coto de Caza, CA (US); Frederick Johnson Morgan, Coto de Caza, CA (US); James Madison McCurry, Rockwall, TX (US); Jeffrey Madison McCurry, Plano, TX (US); David Stiles Moderi, Plano, TX (US)

(73) Assignee: Finance Express, LLC, Rancho Santa Margarita, CA (US)

( * ) Notice: Subject to any disclaimer, the term of this patent is extended or adjusted under 35 U.S.C. 154(b) by 998 days.

(21) Appl. No.: 11/738,203

(22) Filed: Apr. 20, 2007

(65) Prior Publication Data

US 2008/0015954 A1    Jan. 17, 2008

Related U.S. Application Data

(60) Provisional application No. 60/793,596, filed on Apr. 20, 2006.

(51) Int. Cl.
G06Q 40/00 (2006.01)
(52) U.S. Cl. .................. 705/38; 705/26; 705/27; 705/35
(58) Field of Classification Search .................. 705/35, 705/26, 27, 38
See application file for complete search history.

(56) References Cited

U.S. PATENT DOCUMENTS

| | | | |
|---|---|---|---|
| 5,611,052 A | 3/1997 | Dykstra et al. | |
| 5,758,328 A | 5/1998 | Giovannoli | |
| 5,774,883 A * | 6/1998 | Andersen et al. | 705/38 |
| 5,878,403 A | 3/1999 | DeFrancesco et al. | |
| 5,940,812 A | 8/1999 | Tengel et al. | |
| 5,995,947 A | 11/1999 | Fraser et al. | |
| 6,385,594 B1 | 5/2002 | Lebda et al. | |
| 6,484,153 B1 | 11/2002 | Walker et al. | |
| 6,587,841 B1 | 7/2003 | DeFrancesco et al. | |
| 6,611,816 B2 | 8/2003 | Lebda et al. | |
| 7,181,427 B1 | 2/2007 | DeFrancesco et al. | |
| 7,742,980 B1 * | 6/2010 | Klein | 705/38 |
| 2001/0034700 A1 * | 10/2001 | Foss et al. | 705/38 |
| 2001/0037288 A1 * | 11/2001 | Bennett et al. | 705/35 |
| 2003/0069837 A1 * | 4/2003 | Mills et al. | 705/38 |
| 2003/0139990 A1 | 7/2003 | Greco | |
| 2003/0229582 A1 | 12/2003 | Sherman et al. | |
| 2004/0030639 A1 * | 2/2004 | Lebda et al. | 705/38 |
| 2004/0205019 A1 | 10/2004 | Painter et al. | |
| 2005/0278249 A1 * | 12/2005 | Jones et al. | 705/38 |
| 2007/0011083 A1 * | 1/2007 | Bird et al. | 705/38 |
| 2007/0067229 A1 * | 3/2007 | Parthasarathy | 705/35 |
| 2007/0168278 A1 * | 7/2007 | Peterson et al. | 705/38 |

OTHER PUBLICATIONS

Thinakal. "The Business of Internet Lending." Mortgage Banking, Oct. 1996, pp. 131-134, vol. 57, No. 1.*

* cited by examiner

Primary Examiner — Jason Dunham
(74) Attorney, Agent, or Firm — Snell & Wilmer L.L.P.

(57) ABSTRACT

Embodiments of systems and methods are disclosed that manage transactions and communication between car dealers and lenders. In one embodiment, the system lessens risks for lenders and makes relationships with dealers safer and easier to administer. In one embodiment, a dealer may utilize the system to manage its inventory, obtain and manage credit history information about potential customers, help customers apply for credit, transact credit applications and credit approvals with various lenders, submit applications to multiple lenders, select from among the accepting lenders, and manage forms used to complete a transaction.

8 Claims, 27 Drawing Sheets

Pacific Auto Sales-Newport Beach, CA

| Home | Apps | Inventory | Reports | Calculator | Calendar | Settings | Help | Log Out |

FEX News

NEW LENDER!
Bay View Acceptance Corporation will be coming online soon in 30+ states! Visit the "Lender Information" area on the home tab to learn more!

NEW SOUTH!
Your Weather

Newport Beach, Ca
12:53 PM PDT
Hazy
71 F
SW 9 MPH

FEX Dashboard

| Applications | Today | Month | Year |
|---|---|---|---|
| Funded | 0 | 3 | 21 |
| Approved | 0 | 7 | 47 |
| Declined | 0 | 0 | 3 |
| Pending | 0 | 1 | 31 |
| Totals | 0 | 11 | 102 |

FEX Alert

New Sign Up Instructions for Sterling Financial

Signing up with Sterling is now easier and faster! Please click on the "Sign Up Forms" link next to Sterling on the Lender Information page.

New South Federal Savings Bank has new sign ip forms. Download and sign up today!

Idustry News

FASTLANE IN NV & HI!
Fastlane has just announced the addition of Nevada and Hawaii to the Finance Express program. If you are in these states, visit the "Lender Information" area to download and sign the Fastlane dealership agreement today!

Escrow Information >>
Lender Information >>

Dealer Management System  
Dealer name  
User ID

| HOME | DEALS | INVENTORY | NOTES REC. | REPORTS | SETTINGS | ACCOUNTING | HELP | LOG OUT |

Notes
- Acme Capital signs agreement with DMS
- Lavender Book used vehicle values added to DMS

Dashboard  June 30, 2005

*Sales for today*
- Total Sales $0.00
- Cash Sales $0.00
- In-house Sales $0.00
- Special Finance sales $0.00
- Whole Sales $0.00

*Inventory*
- No. vehicles in stock 26
- Base inventory cost $295,729.00
- Repair / Make Ready Cost $335.94
- Total Inventory Cost $296,064.94
- Vehicles Added Today 0
- Vehicle Value $0.00

*Accounts Receivable*
- # of Active Accounts 39
- Principal Balance (P.L.) $781,321.51
- Account Balance $894,016.78

*Past Due Accounts*
- # of Past Due Accounts 36
- Principal Balance $733,080.93
- % of Principal Balance 93.8285%
- Accounts Balance $854,107.45
- % of Account Balance 94.5293%

*Total Payments Past Due* $752,477.91

*Transaction Summary*
- Total Collected Today $0.00
- Total Adjustments $0.00
- Total Sold / transferred 0.00

[Refresh Snapshot]

Industry News
- Vehicle sales hit record
- Visit us at the 61st annual NIADA Convention and Expo
- More information

Important Links
- ☒ Escrow Information
- ☒ Lenders You're Linked To
- ☒ Lead Generation

Your Weather

Drizzle  
Temp: 41°F

- Humidity: 93%
- Wind: E12
- Speed: MPH
- Barometer: 30 in
- Dewpoint: 39°F
- Wind Chill: 35°F

FIG. 4

Pacific Auto Sales-Newport Beach, CA

| Home | Apps | Inventory | Reports | Calculator | Calendar | Settings | Help | Log Out |

Loan Applications Options>> New App | List | Search | Reset Search

| App Info | Credit | Emp Info | Co Info | Co Emp | Trade In | Desking | Lender | Funding | Forms | Notes |

NMOONFLOWER, DUNCAN                                    Application ID 1789981

Application Information    Created: Jun 21, 2005 11:06 AM    Status: New Application

Borrower Information

First Name [DUNCAN]        Last Name [MMOONFLOWER]        SSN** [396] [30] [0460]

DOB** [Jan ▾] [29 ▾] [1948 ▾]    Email* [       ]        Home Phone* [346] [535] [2433]

Drivers Lic. [4]    DL State [CA ▾]                Credit Report

**items required for Credit

Current Residence

Residence*   ○ Rent    Address** [5539 BARRINGTON HT]              Payment* [565400]

● Own    City / State / Zip** [MEMPHIS] [TN ▾] [38181]    Landlord Name [       ]

○ Other  How Long?* [5] Yrs [0] Mos                 Landlord Phone [       ]

Prior Residence
If applicant has lived at current residence less than two years, please provide information on the prior residence.

Residence*   ○ Rent    Address** [       ]

● Own    City / State / Zip** [       ] [CA ▾] [       ]

○ Other  How Long?* [0] Yrs [0] Mos

FIG. 5A

*Pacific Auto Sales-Newport Beach, CA*

| Home | Apps | Inventory | Reports | Calculator | Calendar | Settings | Help | Log Out |

Loan Applications Options >> New App | List | Search | Reset Search

| App Info | Credit | Emp Info | Co Info | Co Emp | Trade In | Desking | Lender | Funding | Forms | Notes |

NMOONFLOWER, DUNCAN                                                    Application ID 178998

| SSN | Name | Score | Date | Dealership |

Equifax:  396-30-0460   MMOONFLOWER, DUNCAN   2005-06-21 11:49:28   Newport Beach, CA   [Pull Credit] [View Report]

[ ] [Search]

FIG. 6

Pacific Auto Sales-Newport Beach, CA

| Home | Apps | Inventory | Reports | Calculator | Calendar | Settings | Help | Log Out |

Loan Applications Options >> New App | List | Search | Reset Search

| App Info | Credit | Emp Info | Co Info | Co Emp | Trade In | Desking | Lender | Funding | Forms | Notes |

NMOONFLOWER, DUNCAN   Application ID 1789981

Application Information   Created: Jun 21, 2005 11:06 AM   Status: New Application

Current Employment

Occupation [Teacher]

Employer [west middle school]   Work Phone [574] [767] [6737] x [6767]

Drivers Lic. [123 main st]   How Long [15] Years [0] /Month

City/State/Zip [trabuco canyon] [CA ▾] [92679]

Notes [                    ]   Monthly Income [6500.00]

Previous Employment
If applicant has worked with the current employer for less than two years, please provide information on prior employee.

Occupation [          ]   ○ Full Time   Work Phone [   ] [   ] [   ] x [   ]

Employer [          ]   ○ Part Time   How Long [   ] Years [   ] /Month

Drivers Lic. [          ]   □ Self Employed

City/State/Zip [          ] [CA ▾]   Monthly Income [6500.00]

[Search]

*FIG. 7*

*Pacific Auto Sales-Newport Beach, CA*

| Home | Apps | Inventory | Reports | Calculator | Calendar | Settings | Help | Log Out |

Loan Applications Options >> New App | List | Search | Reset Search

[_____] Search

| App Info | Credit | Emp Info | Co Info | Co Emp | Trade In | Desking | Lender | Funding | Forms | Notes |

NMOONFLOWER, DUNCAN                                    Application ID 1789981

*Vehicle 1*

VIN*           [1HGCM6884A082420] [Lookup]      Year* [2004]    Make* [HONDA]       Model* [_____]

Purchase Date* [Jan ▾] [N/A ▾] [N/A ▾]          Mileage* [25000]    NADA Trade In [20900.00]    ⊙ Financed  ○ Leased  ○ Paid Lender [WELLS]                                  Payment [0.00]    Interest Rate [0]    Payoff Amount* $[22000.00]

Pacific Auto Sales-Newport Beach, CA

| Home | Apps | Inventory | Reports | Calculator | Calendar | Settings | Help | Log Out |

Loan Applications Options >> New App | List | Search | Reset Search

| App Info | Credit | Emp Info | Co Info | Co Emp | Trade In | Desking | Lender | Funding | Forms | Notes |

NMOONFLOWER, DUNCAN                    Application ID 1789981

| Lender | Tier | Criteria | Status | Date | Decision | Notes | Action |
|---|---|---|---|---|---|---|---|
| DeALease-CA | Default | The customer's credit score is below the 640 required | | | | | Submit To All Qualified Lenders |
| Fastlane-CA | Level 1 | The customer's credit score is outside of the lender's range of 600-650 | | | | | |
| | Level 2 | The customer's credit score is outside of the lender's range of 550-599 | | | | | |
| | Level 3 | The customer's credit score is outside of the lender's range of 500-549 | | | | | |
| Fireside-CA | Sub-Prime | Meets scorecard criteria | Approved | Sent: 6/21/05 12:00AM Recv: 6/22/05 1:55PM | Appr Amt 45000.00 Appr Pay 9999.99 Max Pay 349.00 | all normal stips drivers lic pay stub and 4 ref personal | Send To Desking |

FIG. 10B

Mission Financial-CA | Default | Meets scorecard criteria | Declined

Sent: 6/21/05 12:00AM
Recv: 6/22/05 1:55PM

Appr Amt 45000.00
Appr Pay 9999.99
Max Pay 349.00
Int Rate 16.0000
Buy Rate 16.0000
Loan Term 60
Exp. Date 2005-07-22
Min. Date 00:00:00
Min. Year 2002
Max Mile 4500
Max LTV 99.9999
Loan 0.00
? Acq Fee 249.00

Sent: 6/21/05 12:00AM
Recv: 6/27/05 8:31AM

Resubmit To Lender

*Pacific Auto Sales-Newport Beach, CA*

| Home | Apps | Inventory | Reports | Calculator | Calendar | Settings | Help | Log Out |

Loan Applications Options >> New App | List | Search | Reset Search

| App Info | Credit | Emp Info | Co Info | Co Emp | Trade in | Desking | Lender | Funding | Forms | Notes |

MMOONFLOWER, DUNCAN                                              Application ID,178984

Save

| Customer | Vehicle | Trade in | Trade in | Inventory | Summary | Funding | Unwind |

Name: DUNCAN, MMOONFLOWER                                        ☐ Archived

Total Finance Amount $: 14,761.92    Proceeds Amount $: 0.00         Monthly Payment: 356.98    Term: 60
Contract Date:           Date To Bank:            Fund Date:              Proceeds Date:
06/30/2005               00/00/0000               00/00/0000              00/00/0000
MM/DD/YYYY               MM/DD/YYYY               MM/DD/YYYY              MM/DD/YYYY
Contract Rate %: 16.00000    Buy Rate %: 16.00000   Insurance Needed: ○ Yes  ● No    Bank Fee $: 250.00
Lender: Fireside    Sub: Prime      Lender's Deal No:                     Funding Status: ▼
Funding Notes: 06/30/2005 03:27 PM                  Reason for unwind:

```
06/30 15:27  Funding  hubie    *** Status Changed to CM Package Review ***
06/30 15:22  Funding  hubie    *** Status Changed to Unwind ***
06/22 18:45  Funding  hubie    ttrysf
06/22 18:45  Funding  hubie    *** Status Changed to CM Package Review ***
```

Customer
Priority: 0                 Funding Status:                  Deal No: 412    Month: Jun ▼ 2005 ▼
Contract Date: 06/30/2005        SSN: 396300460          Ad Source:
Home: 346-3-535-2433       Work: 574-767-6767
Co-Signer First Name:      Co-Signer Last Name:              Co-Signer Relation to Buyer:

Vehicle
Stock No: pa000999    VIN: 1FAFP55S74A182217       Mileage: 25000         Days In Stock: 43
Year: 2004            Make: Ford                  Model: Taurus-V6

Trade In
VIN: 1HGCM66884A092420    Mileage: 25000    Year: 2004    Make: Honda    Model:
Trade ACV $: 20,500.00    Payoff $: 22,000.00    Payoff for:

Structure
Lender: Fireside                Tier: Sub-Prime
Sale Price $:          13,932.92                   Net Down Payment $:     600.00
Cash Down $:            2,100.00    15.07%         Net Down as % of Sale:    4.31 %
Manufacturer Rebate $:      0.00                   State Tax $:              0.00
Trade Allowance $:     20,500.00                   License $:               55.00
Payoff Amount $:       22,000.00                   Credit/Life Price $:      0.00
Total Amount $:        13,332.00                   Registration $:           9.00
Doc Fees $:                45.00
Warranty Price $:       1,295.00
Cap Price $:                0.00
Total Finance Amount $: 14,761.92

|       | Trade | Advance | Finance |
|-------|-------|---------|---------|
| KELLEY | $12,425.00 | 107.31 % | 118.81 % |
| NADA | $10,925.00 | 122.04 % | 135.12 % |

Inventory
Inventory Cost $:                                               10,300.00
Deductions:
Repair Orders 1: 121                                               300.00
Repair Orders 2:                                                     0.00
Dealer Pack $:                                                       0.00
Wholesale Pack $:                                                    0.00
Others:                                                              0.00
Total Dealer Deductions $:                                         300.00
Adjusted Inventory Cost $:                                      10,600.00

Summary
Total Finance Amount $:   14,761.92          Bank Fee $:           250.00
Reserve $:                     0.00          Warranty Cost $:      650.00
Credit/Life Cost $:            0.00          Cap Cost $:             0.00
Inventory Cost $:         10,300.00          Total Dir Deductions $: 300.00
Trade ACV $:              20,500.00          Trade Payoff Amount $: 22,000.00
Cash Down $:               2,100.00          Sales Tax $:            0.00
Doc Fees $:                   45.00          License/Reg $:         55.00
Front Profit $:            3,127.91          Back Profit $:        645.00
Gross Profit $:            3,772.91

Save

FIG. 11

Pacific Auto Sales-Newport Beach, CA

| Home | Apps | Inventory | Reports | Calculator | Calendar | Settings | Help | Log Out |

Loan Applications Options >> New App | List | Search | Reset Search

| App Info | Credit | Emp Info | Co Info | Co Emp | Trade In | Desking | Lender | Funding | Forms | Notes |

NMOONFLOWER, DUNCAN     Application ID 1789981

Forms

| Name | Blank | View Document |
|---|---|---|
| ☐ Power of Attorney for Buyer | Blank Form | View Document |
| ☐ Retail Simple Interest Contract | Blank Form | View Document |
| ☐ Retail Pre-Computed Interest Contract | Blank Form | View Document |
| ☐ Title Transfer and/or Registration | Blank Form | View Document |
| ☐ Agreement to Provide Insurance | Blank Form | View Document |
| ☐ Credit Application | Blank Form | View Document |
| ☐ Power of Attorney for Seller | Blank Form | View Document |
| ☐ Escrow Check List | Blank Form | View Document |
| ☐ Bill of Sale | Blank Form | View Document |

Fax Attachments*

| Name | View |
|---|---|
| ☐ Fax Cover Page | View Cover Page |

*You can attach documents like drivers licenses and proof of insurance, by faxing them to the Finance Express system. Print the "Fax Cover Page" and attach it with the documents for each loan application.

To view the online forms and FAX documents, please be sure to download the latest Adobe Acrobat Reader.

Search

FIG. 12

Pacific Auto Sales-Newport Beach, CA

| Home | Apps | Inventory | Reports | Calculator | Calendar | Settings | Help | Log Out |

Loan Applications Options >> New App | List | Search | Reset Search

| App Info | Credit | Emp Info | Co Info | Co Emp | Trade In | Desking | Lender | Funding | Forms | Notes |

NMOONFLOWER, DUNCAN                                                              Application ID 1789981

| Date | User | Notes |
|---|---|---|
| 2005-06-30 15:27:43 | hubie | *Status Changed to CM Package Review* |
| 2005-06-30 15:22:47 | hubie | *Status Changed to Unwind* |
| 2005-06-27 08:31:28 | $LenderName | Mission Financial Decision- |
| 2005-06-27 08:29:46 | $LenderName | Nation Wide Decision- |
| 2005-06-22 18:45:53 | hubie | tyrysf |
| 2005-06-22 18:45:53 | hubie | ***Status Changed to *** |
| 2005-06-22 18:45:04 | hubie | *Status Changed to CM Package Review* |
| 2005-06-22 18:44:31 | FEX | Removing submission to nationwide submission #178981 |
| 2005-06-22 14:09:13 | $LenderName | WFI Decision- |
| 2005-06-22 14:00:43 | $LenderName | Nation Wide Decision- |
| 2005-06-22 13:55:43 | $LenderName | Fireside Decision- |
| 2005-06-21 11:59:39 | hubie | *Desking Vehicle Selected* |
| 2005-06-21 11:55:40 | hubie | *New Desking Record Created* |
| 2005-06-21 11:49:28 | hubie | *EQUIFAX Credit Report Pulled* |
| 2005-06-21 11:06:46 | hubie | Application created-51 |

Add Note

Note

FIG. 13

Pacific Auto Sales-Newport Beach, CA

| Home | Apps | Inventory | Reports | Calculator | Calendar | Settings | Help | Log Out |

Inventory Options >> Add | List

[_____] [Search]

| | Year | Make | Model | Mileage | Stock | VIN | NADA | KBB | Invoice | Cost |
|---|---|---|---|---|---|---|---|---|---|---|
| View | 2002 | CHEVEROLET TRUCK | TRAILBLAZER-16 | 2400 | dh7788 | IGNDS13S122317122 | 14600 | 16125 | 0 | 13700 |
| View | 2002 | CHEVEROLET TRUCK | TRAILBLAZER-16 | 2400 | ha1234 | IGNDS13S822241270 | 14500 | 16125 | 0 | 13700 |

Pacific Auto Sales-Newport Beach, CA

| Home | Apps | Inventory | Reports | Calculator | Calendar | Settings | Help | Log Out |

Report Options >> Dealership | Credit

Dealership Report

| Start Date | Jul 1, 05 12:00am ☐ | End Date | Jul 31, 05 11:59pm ☐ | Submit |

Pacific Auto Sales

1 App(s) ☐

| Date | Name | App ID | Status | Lender | Status | Date sent | Date Recv | Difference |
|---|---|---|---|---|---|---|---|---|
| 2005-Jul 05 | WWEIGELA | 178997 | Lender | Auto Underwriters | Pending | Jul-05 12:00am | N/A | N/A |
| | | | | Nationwide | Pending | Jul-05 12:00am | N/A | N/A |
| | | | | Mission Financial | Pending | Jul-05 12:00am | N/A | N/A |
| | | | | Fireside | Pending | Jul-05 12:00am | N/A | N/A |
| | | | | Fastlane | Pending | Jul-05 12:00am | N/A | N/A |

 Print Form

FIG. 16

Pacific Auto Sales-Newport Beach, CA

| Home | Apps | Inventory | Reports | Calculator | Calendar | Settings | Help | Log Out |

Calculators >> 4 Square Calculator | Loan Calculator | Reserve Calculator

4 Square Calculator

| Trade In | | | Vehicle Price | |
|---|---|---|---|---|
| Trade in value | $ 9,000.00 | | Vehicle Price | 30,000.00 |
| 20 payments of | $ 300 | | Trade-in & Cash Down | $5,000.00 |
| Payoff (bank) | $ 6,000.00 | | | |
| Final Trade in | $3,000.00 | | Amount Financed | $25,000.00 |

| Cash Down | | | Monthly Payments | |
|---|---|---|---|---|
| | | | Annual Percentage Rate | 6.5 % |
| Amount Down | $ 2,000.00 | | Term | 60 months |
| | | | Monthly | $ 490.29 |
| | | | Can Afford | $ -- |

FIG. 17

Search

Pacific Auto Sales-Newport Beach, CA

| Home | Deals | Inventory | Notes Rec. | Reports | Settings | Accounting | Help | Log Out |

LOOKUP AN ACCOUNT | COLLECT QUEUE | QUEUE BUILDER | DAILY RECAPS | ASSET RECOVERY | COLLECTOR STATS

| Last Name: | First Name: | SSN | Phone # | Account # | Stock # | VIN | | Find |

» Advance Search

| Borrower Name | Loan # Account # | Stock # Plate # | VIN Collateral | Status Act Tier (Act Day PD) | Acct Balance | Notes | Action |
|---|---|---|---|---|---|---|---|
| AAloe, Jake | 001-1003 314 | P1015 | JTDDR32TX50184693 2005 Toyota Celica | Active T3 - Past Due 31 - 60 (51) | $19,995.00 | Notes | Post Payment |
| Bbean, Betty | 001-1053 346 | P1031 | 1B3ER65E32V102046 2002 Dodge Viper | Active T3 - Past Due 31 - 60 (48) | 59,500.00 | Notes | Post Payment |
| BBugleweed, Charles | 001-1001 265 | P1013 | 5TDBT48A14S226569 2004 Toyota Sequoia | Repossessed T7 - Repossession (69) | $25,367.40 | Notes | Post Payment |
| Bracket, Tony | 001-1045 329 | P1008 | 4t1be32k46u741646 2006 Toyota Camry | Active T1 - Past Due 0 - 15 (13) | 1,396.00 | Notes | Post Payment |

FIG. 25

SYSTEMS AND METHOD FOR MANAGING DEALER INFORMATION

PRIORITY INFORMATION

This application claims priority to U.S. Provisional Patent Application No. 60/793,596, filed Apr. 20, 2006, the entirety of which is hereby incorporated by reference and made part of this specification.

LIMITED COPYRIGHT AUTHORIZATION

A portion of the disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

BACKGROUND

1. Field of the Invention

This invention relates to the field of computer management systems generally and in particular to a computer system for managing the aspects of completing vehicle sales.

2. Description of the Related Art

The purchase of a large ticket item, such as a vehicle, can be a complex and time-consuming process involving numerous entities. A typical vehicle purchasing process can include finding a dealer from which to purchase a vehicle and finding a suitable vehicle. A vehicle buyer may wish to finance the vehicle purchase using a loan product from a bank or other money lender. In order to complete a deal, the purchaser, money lender, and vehicle dealer typically agree to terms of purchase and financing. The terms of purchase and financing may depend on the vehicle that the purchaser wishes to buy. In addition, a credit bureau may be involved in providing credit information for a lender to evaluate a potential buyer or loan applicant. Data, such as credit scores and histories, must be gathered and numerous forms typically exchange hands, such as loan applications, bill of sale, loan contracts, title transfers, registrations, and many other possibilities. The lag time in filling out and submitting these forms can often create a frustrating experience for the purchaser. Dealers are often forced to learn numerous systems and forms with which to interact with the different entities involved.

Purchasing a used vehicle, particularly from an independent dealer, may present special difficulties. Lenders are often uninterested in approving loans and dealing with independent used vehicle dealers due to a number of factors. In some cases, the purchasers may be more of a credit risk. In others, the used vehicle may be less attractive collateral than another type of new or used vehicle. In still others, a lender may be wary of the used vehicle dealer based on the dealer's smaller size, low transaction volume, or even the possibility of fraud. Nonetheless, lenders have an incentive to engage in transactions with used vehicle dealers, because each loan that a lender is able to successfully fund and collect generally increases the lender's revenue. Used vehicle dealers must overcome many of these risk factors, whether real or imaginary, in order to maintain and grow a successful business.

SUMMARY OF THE INVENTION

Accordingly, in one embodiment, it would advantageous to provide a system that manages entire transactions and communication between the various parties involved. In addition, in one embodiment, a system that lessens risks for lenders and makes used-car dealers safer and easier to deal with is desirable. It is an object of one embodiment to provide a robust sales management system and methods that streamline a dealer's disparate credit, loan, and inventory systems by providing an interface through which an entire credit-based purchase transaction may be concluded. Through the system and methods a dealer may manage its inventory, obtain and manage credit history information about potential buyers, help the buyers apply for credit, transact credit applications and credit approvals with various lenders, and manage forms used to complete a transaction. A dealer may simultaneously submit credit applications on behalf of a potential buyer to multiple lenders and may choose from among the accepting lenders.

It is a further object of one embodiment to provide incentives for lenders to participate in this system by reducing the risks involved in used car or other credit-based transactions. In one embodiment, the systems and methods filter credit applications based on lender criteria and only send applications to lenders that meet the criteria. This reduces hassle in sifting through and rejecting applications that the lender is rarely or never comfortable granting. Furthermore in one embodiment, lenders may also filter credit applications based on the collateral. In the case of used cars, this would include the car itself. A lender may specify certain vehicle makes, models, years, colors, and the like. In another embodiment, the sales management system and methods may check a dealer's final terms against the loan offer requirements approved by a lender who has accepted an application. This may help ensure that the dealer and lender do not have to haggle back and forth about final terms. In another embodiment, an audit trail is kept of applications entered and data changed in the application.

It is a further object of one embodiment to provide a primary source for forms required to complete a transaction. In one embodiment, the requisite forms are propagated based on the customer data, application data, inventory data, and the like. These forms are then printable by the dealer. In one embodiment, the sales management system is able to seamlessly update any forms changed by lenders, government entities and the like, so that a dealer prints up-to-date forms that include the current data for any given transaction.

It is another object of one embodiment to facilitate and/or incorporate the use of an escrow process to complete the used car purchase. In one embodiment, the lender submits the funds that it has agreed to disburse into an escrow account and the dealer submits the title and registration documents to an escrow entity or module. After the escrow entity or module takes care of any outstanding obligations and completes the submission of the title and registration documents to the correct government office, then it will release the funds. This provides significant protection for lenders wary of used car dealers.

In one embodiment, a system is provided for helping a dealer sell a vehicle to a customer. The system includes an entry module permitting the entry of data relating to the customer and data relating to a proposed purchase of a vehicle by the customer from the dealer. A filter module matches at least some of the customer data or the data relating to the proposed purchase with lender criteria, wherein the lender criteria are selected to identify lenders that are willing to consider providing a loan for the purchase of the vehicle. A lender selection module is configured to select a subset of the matched lenders to increase a probability that at least one of the matched lenders approves the loan. A transmission module is configured to transmit the customer data to the subset of lenders.

In a further embodiment, a system is provided for helping a dealer sell a vehicle to a customer. The system includes an entry module permitting the entry of data relating to the customer and data relating to a proposed purchase of a vehicle by the customer from the dealer. A lender management module matches at least some of the customer data or the data relating to the proposed purchase with lender criteria, wherein the lender criteria are selected to identify lenders that are willing to consider providing a loan for the purchase of the vehicle. A transmission module is configured to transmit the customer data to at least some of the matched lenders. A notes receivable module is configured to provide one or more tools to help the dealer to service a dealer-provided loan.

In an additional embodiment, a used vehicle finance system is provided. The used vehicle finance system includes a loan application module configured to accept customer data and vehicle data wherein the vehicle data includes data specific to used vehicles. A lender filter module is configured to match lender criteria with the information collected by the loan application module to determine which lenders may be willing to finance a given buyer and vehicle combination, wherein the lender criterion includes factors that are specific to used vehicles.

One embodiment provides a method of facilitating a sale of a vehicle from a dealer to a buyer. The method includes placing funds from a lender designated for the sale into an account that cannot be accessed by the dealer. Electronic title to the vehicle being sold is received from the dealer. The electronic title is held such that the lender does not have access to the electronic title. The funds are released to the dealer and the title to the lender upon confirmation that the lender has approved the electronic title and a lien on the vehicle.

One embodiment provides a computer-based vehicle sales management system. The vehicle sales management system includes a server module configured to communicate with a remote computer system. A dealer management module is in communication with the server module. The dealer management module includes an inventory module for maintaining information about a vehicle inventory of a dealer. A lender management module is in communication with the dealer management module. The lender management module is configured to receive loan application data from the dealer management module, receive loan application decision information from at least one lender, and provide the loan application decision information to the dealer management module.

A further embodiment provides a system for marketing a used product. The system includes an inventory module that maintains information about the used product, wherein the information about the used product comprises a picture of the used product. An interface module receives a schedule for obtaining supplemental advertising placements from a user of the system. A retail listing module is configured to place advertisements for the used product with at least one retail listing service according to the schedule while the used product remains unsold.

For purposes of summarizing the invention, certain aspects, advantages and novel features have been described herein. Of course, it is to be understood that not necessarily all such aspects, advantages or features will be embodied in any particular embodiment. Moreover, it is to be understood that not necessarily all such advantages or benefits may be achieved in accordance with any particular embodiment of the invention. Thus, for example, those skilled in the art will recognize that the invention may be embodied or carried out in a manner that achieves one advantage or group of advantages as taught herein without necessarily achieving other advantages or benefits as may be taught or suggested herein.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements.

FIG. 3A illustrates one embodiment of a total sales management Home Page.

FIG. 3B illustrates an alternative embodiment of a total sales management Home Page incorporating dealer direct lending information.

FIG. 4 illustrates one embodiment of a Loan Applications List Page.

FIG. 5A illustrates one embodiment of a New Application Page.

FIG. 6 illustrates one embodiment of a Loan Application Credit Page.

FIG. 7 illustrates one embodiment of a Loan Application Employment Information Page.

FIG. 8 illustrates one embodiment of a Loan Application Trade In Page.

FIG. 9 illustrates one embodiment of a Loan Application Desking Page.

FIGS. 10A and 10B illustrate one embodiment of a Loan Application Lender Page.

FIG. 11 illustrates one embodiment of Loan Application Funding Page.

FIG. 12 illustrates one embodiment of a Loan Application Form Page.

FIG. 13 illustrates one embodiment of Loan Application Note Page.

FIG. 14 illustrates one embodiment of an Inventory List Page.

FIG. 15 illustrates one embodiment of an Inventory Add Page.

FIG. 16 illustrates one embodiment of a Reports Page.

FIG. 17 illustrates one embodiment of a Calculator Page.

FIG. 25 illustrates one embodiment of a Notes Receivable Page.

DETAILED DESCRIPTION OF PREFERRED EMBODIMENTS

Figure 1:
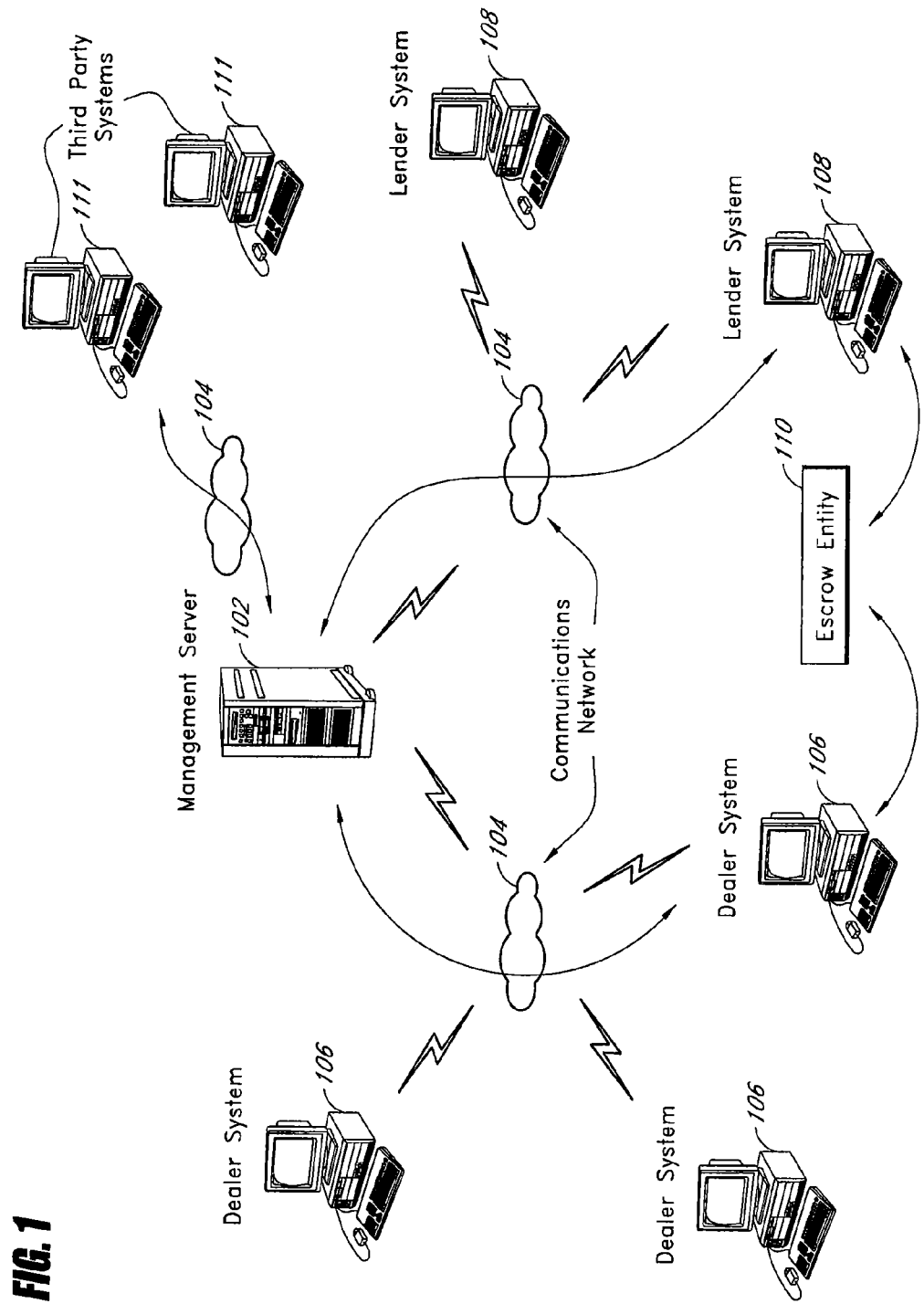
FIG. 1 is a high-level block diagram of one embodiment of a sales management system including a management server in communication with a dealer system, a lender system, and other systems.

Systems and methods which represent various embodiments and example applications of the present disclosure will now be described with reference to the drawings.

For purposes of illustration, some embodiments will be described in the context of auto sales. The present invention is not limited by the type of environment in which the systems and methods are used; the systems and methods may be used in other environments, such as, for example, new auto sales, mortgage transactions, sales of merchandise, other sales, and so forth. The figures and descriptions, however, relate to embodiments in an auto sales environment. The system may include a variety of uses, including but not limited to dealers, lenders, and their staff and personnel. It is also recognized that in other embodiments, the systems and methods may be implemented as a single module and/or implemented in conjunction with a variety of other modules and the like. Moreover, the specific implementations described herein are set forth in order to illustrate, and not to limit, the invention. The scope of the invention is defined by the appended claims.

I. Overview

The sales management system as contemplated by one embodiment of the disclosure herein generally comprises a management server connected to one or more dealer systems and one or more lender systems through a communications network or networks. The communications network may include one or more of a local area network ("LAN"), a wide area network ("WAN"), an intranet, a wired network, a wireless network, the Internet or the like. In one embodiment, the management server comprises a Web server connected to the World Wide Web. Dealers, call centers, and lenders are then able to connect to the management server through their respective systems comprising any network-enabled and connected device, such as, for example, a personal computer ("PC"). Some embodiments of the present invention may be particularly well-suited to used car dealership applications. In other embodiments, instead of and/or in addition to a Web-based system, some or all of the system may be implemented using one or more standalone programs executable within an environment such as a computer operating system.

An example that considers the use of the system with a hypothetical purchaser, Paula, and dealer, Dan, may be illustrative. Paula comes to Dan's dealership one day and decides to purchase a 2001 BMW, having heard that the German car was well built and maintains its value longer than most cars. Dan is eager to sell the car, but Paula does not have sufficient cash on hand to buy the car outright. She could leave the lot and obtain financing from a bank and later returning to buy the car, but that would be time consuming and quite a hassle. Dan could also make inquiries with various lenders with whom he has dealt, but this may also take time and require duplication of effort if he needs to check with more than one lender. However, Dan may streamline the entire purchase by using one embodiment of a sales management system. The sales management system tracks Dan's customers and his inventory of cars and maintains his connections with a number of lenders. To complete this transaction, Dan sits down at his web-enabled PC, opens an Internet browser program, such as for example, Internet Explorer, and logs on to the management server, hosted on a web-server accessible via a network such as the World Wide Web. Here, Dan can enter information about Paula, such as her name, social security number, and address. Using this information the system may retrieve a credit history report and credit score. Dan can then link the selected BMW from his inventory to Paula's application. The management server then uses that accumulated data to determine lenders that may accept Paula's credit application. Dan then selects five of the lenders. The system sends Paula's application to those lenders, and the lenders are able to review her information and approve or deny the application. The system transmits these responses to Dan who can then choose, from the approved applications, the best lender offer. Upon choosing a lender, Paula and Dan finalize the terms of the deal, and the system transmits those details to the lender. The system also propagates the purchase agreement, credit forms, title and registration, and any other forms needed to complete the transaction. Dan is able to print these out for Paula to sign. The title and registration may then be placed in escrow while the lender submits the funds to escrow as well. Once the title and registration are properly updated and filed with the state department that deals with motor vehicles ("DMV"), the escrow entity releases the funds to Dan, and Paula is able to drive her BMW away. Because the system is fully integrated, Dan's inventory will now show that the BMW was sold, and he can retrieve information on the lender's responses.

FIG. 1 illustrates one embodiment of a sales management system in which a management server 102 communicates with one or more dealer systems 106 and one or more lender systems 108 via a communications network or networks 104. In a preferred embodiment of the sales management system, dealer systems 106, lender systems 108, and/or the management server 102 may also be in communication with an escrow entity 110. This may be through a similar or different communications network as labeled 104 in FIG. 1. In such a case, system propagated forms that may include electronic signatures of the parties involved may be transferred to an escrow entity 110. Such one embodiment would reduce or eliminate the need for paper documents and reduce transmission time. Although not shown in FIG. 1, in one embodiment, the management server 102 may interact directly with the escrow module or entity 110, and/or the escrow module or entity 110 may be part of the management server 102.

In addition, FIG. 1 illustrates an embodiment where the management server 102 is in communication with third party systems 111 via communications network 104. The third party systems 111 may include, for example, wholesale value guide systems (for example, Kelley Blue Book, and so forth), floor plan financial detail systems, sale system (for example, e-bay, public auction Web sites, and so forth), payroll systems (for example, EDT, and so forth), insurance systems (for example, State Farm, AAA, and so forth), financial systems (for example, loan rate Web sites, bank sites, and so forth), credit reporting systems, vehicle information systems (for example, VIN decoder systems, CARFAX, and so forth), dealer systems (for example, other used car dealers, and so forth), warranty systems, and government systems (for example, motor vehicle department systems, state tax systems, local tax systems, and so forth). This communications network 104 may be through a similar or different communications network as used by the dealer system 106 and/or the lender system 108. In one embodiment, the information is received directly from the third party systems 111 and/or via a partner that collects such information. In addition, in one embodiment, the third party information is stored as electronic documents in management server 102 and one or more of the documents may be made available to the dealers and/or the lenders. This allows, for example, the lender to see the set of documents that will be received at the end of the draft deal, improves the lender's response time by insuring that the necessary documents are complete, thus, in turn, improving the loan process and the likelihood that the loan deal will go through.

II. Sales Management System

As mentioned above, FIG. 1 illustrates one embodiment of a sales management system in which a management server 102 communicates with a dealer system 106, a lender system 108, and third party systems 111 via communications networks 104.

A. Management Server 102

Figure 19:
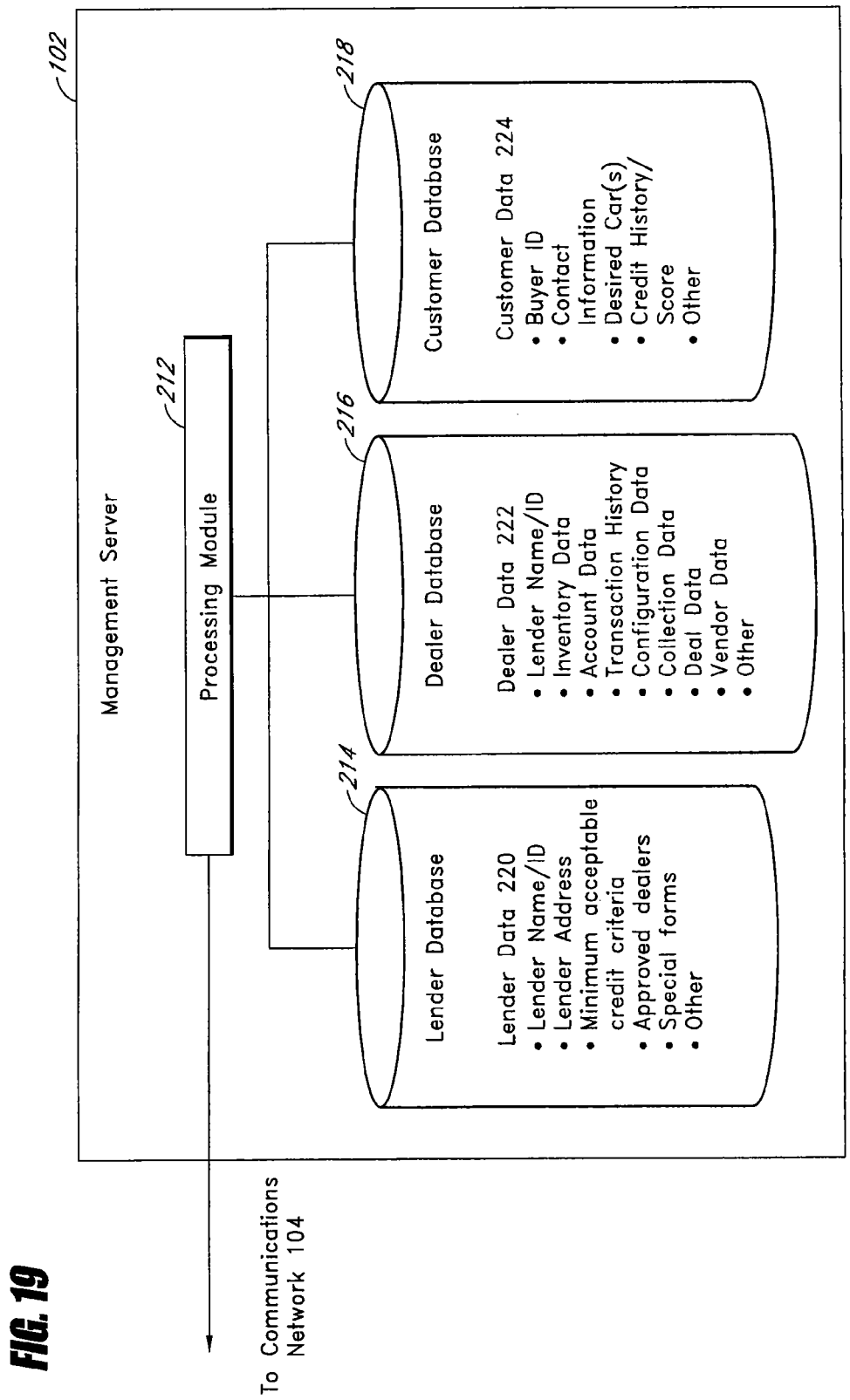
FIG. 19 is a high-level block diagram of one embodiment of a management server.

FIG. 19 illustrates one embodiment of management server 102, comprising a processing module 212, a lender database 214, a dealer database 216, and a customer database 218, storing lender data 220, dealer data 222, and customer data 224 respectively. These databases may be included in a single physical database or numerous databases in various embodiments. Processing module 212 communicates with communications network 104 through a network interface module (not shown) such as, for example, an Ethernet card, modem, cable modem, or the like.

1. Processing Module 212

Processing module 212 communicates with the dealer systems 106 and lender systems 108 over communications network(s) 104. In one embodiment, this communication is done through secure web-based communications, such as HTTPS, the use of an encrypted secure socket layer with the hyper-text transfer protocol. In one embodiment, processing module 212 acts as a Web server, accepting data requests from browsers located on the dealer and lender systems 106, 108 and responding with appropriate Web pages. Processing Module 212 also communicates with databases 214, 216, 218 to store lender data 214, dealer data 216, and customer data 218 sent from the dealer and lender systems, as well as, to retrieve requested data for display or editing on the dealer and lender systems 106, 108.

2. Databases

As stated, in one embodiment, the management server 102 includes a lender database 214, a dealer database 216, and a customer database 218. The lender database 214 is used to store lender data 214. This lender data may include, for example, lender name, ID, contact information, minimum acceptable credit and/or collateral criteria, approved dealers, particularized application or loan forms, and various other types of data associated with given lenders. The lender data may also include lender rules that indicate the lender's criteria. The criteria may include, for example, a minimum credit score, a maximum credit score, a minimum loan amount, a maximum loan amount, a minimum percentage of wholesale price, a maximum percentage of wholesale price, and so forth. In addition, the criteria may include information about the automobiles for which they are willing to grant approval, such as, for example, the year, make, model, mileage, accident history, number of previous owners, age of the vehicle, and so forth. In addition, the criteria may include a range or set of acceptable values and/or unacceptable values. As an example, Lender A may request that for loans over $5000, the buyer must have a credit score greater than 540, but lower than 700; for loans under or equal to $5000, the buyer must have a credit score greater than 440, but lower than 650, and so forth. As another example, Lender A may want to exclude loans for Ford Escorts older than 2000 or any Honda with mileage greater than 100,000. As a further example, Lender A may want to exclude loans for 1986 Toyota Corollas with mileage greater than 150,000 for any buyer who lives more than 30 miles from a major city. One of skill in the art will appreciate the wide range of possible lender criteria that may be used.

In addition, the lender database 214 may also include electronic "dealer agreements" that are provided by the lenders and filled out by the dealers to establish a relationship with between the lender and dealer. Dealers may view the various available lenders, decide to sign up for a lender, and electronically sign up to start a relationship with that lender.

Dealer database 216 is used to store dealer data 222, such as, for example, dealer name or ID, inventory data for the dealer, inventory data for other dealers, customer data (or relational links to a customer database 218), preferred lenders, account data, transaction histories, configuration data, collection data, deal data, vendor data, and other information associated with a dealer.

Finally, customer data 224 is stored in a customer database 218. Customer data 224 may include, for example, the buyer's name, ID, contact information, credit history, credit score, desired car or cars, and other information that may be associated with a buyer, such as the dealer's notes.

It is recognized that the management server 102 may include other types of information as well, such as inventory data, car pricing data, general credit, loan, and registration or title forms, lender forms, and so forth. In addition, in other embodiments, the lender database 214, the dealer database 216, and/or the customer database 218 may be implemented as one or more databases, as one or more flat files, or as individual data items stored in addressable memory space, non-volatile random access memory, flash memory, or a mass storage, such as is found in a hard drive.

It is recognized that the lender database 214, the dealer database 216, and/or the customer database 218 may be implemented using a relational database, such as CodeBase, Sybase, Oracle, and Microsoft® SQL Server as well as other types of databases such as, for example, a flat file database, an entity-relationship database, and object-oriented database, and/or a record-based database. For example, the lender database 214, the dealer database 216, and/or the customer database 218 may include a single database with separate tables or as other data structures that are well know in the art such as linked lists, and binary trees. Moreover, while the lender database, the dealer database, and/or the customer database is shown as three databases, it is recognized that in other embodiments, the database may be stored as a single database, as two databases, or more than three databases.

In other embodiments, the databases may be integrated with the management server 102, or alternatively, connected directly or indirectly to the management server 102.

In one embodiment, one or more of the databases may be connected to a backend component (not shown) that receives database requests via servlets, small programs that run on servers, and sends a corresponding request to the network interface module. It is recognized that in other embodiments data access may be performed differently, for example, a different type of backend component may be used

3. Network Interface Module

The management server 102 may also include a network interface module (not shown) that communicates with the management server 102 to facilitate communication between the management server 102 and the dealer system 106 and/or the lender system 108 via the communications network(s) 104.

The network interface module may utilize a variety of network protocols. In one embodiment, the network interface module includes the Hypertext Transfer Protocol (HTTP). However, it is to be appreciated that other types of network communication protocols may be used, such as Secure HTTP (HTTPS), File Transfer Protocol (FTP), Simple Mail Transfer Protocol (SMTP), and Transmission Control Protocol/Internet Protocol (TCP/IP).

4. Input and Output Devices

The management server 102 may communicate with a set of input and output devices. For example, the input device(s) may include a keyboard, roller ball, pen and stylus, mouse, trackball, voice recognition system, or pre-designated switches or buttons. The input device(s) may also include a touch screen associated with an output device. Textual or graphic information may be entered by the user through the input device. The output device(s) may include a speaker, a display screen, a printer, or a voice synthesizer.

It is recognized that in some embodiments, one or more of the input and output devices may be included in the management server 102. For example, the management server 102 may include a built-in set of speakers and a built-in touchpad.

5. Management Server 102 Information

The management server 102 may include a conventional general purpose single-chip or multi-chip microprocessor such as a Pentium® processor, a Pentium® II processor, a Pentium® Pro processor, an xx86 processor, a Centrino® processor, an 8051 processor, a MIPS® processor, a Power PC® processor, or an ALPHA® processor. In addition, the microprocessor may be any conventional special purpose microprocessor such as a digital signal processor. Furthermore, the management server 102 may each be used in connection with various operating systems such as: Microsoft® Windows® 3.X, Microsoft® Windows 95, Microsoft® Windows 98, Microsoft® Windows® NT, Microsoft® XP, Microsoft® Vista, Microsoft® Windows® CE, Palm Pilot OS, OS/2, Apple® MacOS®, Disk Operating System (DOS), UNIX, Linux®, VxWorks, or IBM® OS/2®, Sun OS, Solaris OS, IRIX OS operating systems, and so forth.

In one embodiment, the management server 102 is a server, personal computer, a laptop computer, a portable computing device, a computer workstation, a local area network of individual computers, an interactive kiosk, a personal digital assistant, an interactive wireless communications device, a handheld computer, an embedded computing device, or the like. In some embodiments, the management server 102 includes two or more computer systems, each of which perform at least some of the operations associated with the management server 102.

As can be appreciated by one of ordinary skill in the art, the management server 102 may include various sub-routines, procedures, definitional statements, and macros. Each of the foregoing modules are typically separately compiled and linked into a single executable program. However, it is to be appreciated by one of ordinary skill in the art that the processes that are performed by selected ones of the modules may be arbitrarily redistributed to one of the other modules, combined together in a single module, made available in a shareable dynamic link library, or partitioned in any other logical way. For example, in one embodiment of the invention, the processing module 212 and the network interface module are integrated into a single executable module. Furthermore, for example, in another embodiment, the processing module 212 is maintained in a dynamic link library that is separate from the network interface module. In addition, the processing module 212, the network interface module, and/or the databases may be either an "application program," reside as part of the operating system for the device, or can reside partly in both As used herein, the word module refers to logic embodied in hardware or firmware, or to a collection of software instructions, possibly having entry and exit points. Furthermore, the modules may be written in any programming language such as C, C++, BASIC, Pascal, Java, and FORTRAN compiled and linked into an executable program, installed in a dynamic link library, or may be written in an interpreted programming language such as BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

6. Management Server 102 Modules

Figure 23:
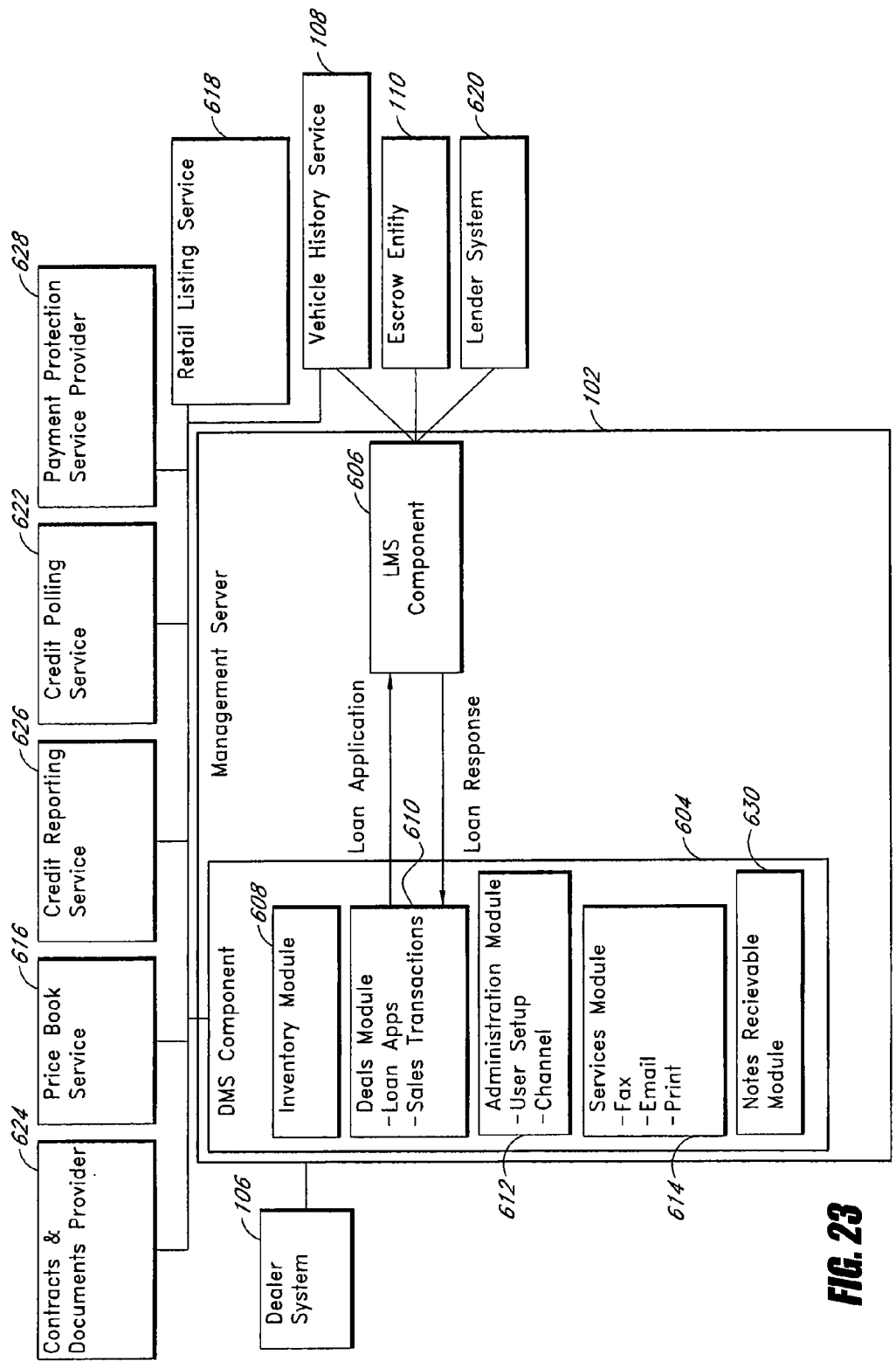
FIG. 23 is a block diagram of one embodiment of a management server in communication with a dealer system, lender systems, and other systems.

FIG. 23 is a block diagram of an embodiment of a sales management system including a management server 102 in communication with a dealer system 106, a lender system 108, and other systems, such as, for example, via one or more communication networks 104. The management server 102 includes a dealer management system (DMS) component 604 and a lender management system (LMS) component 606.

a. Dealer Management System (DMS) Component 604

In the embodiment shown in FIG. 23, the DMS component 604 (also referred to as the dealer management module) includes an inventory module 608, a deals module 610, an administration module 612, a services module 614, and a notes receivable module 630.

In one embodiment, the inventory module 608 includes a repository of information about products that are available for sale. In some embodiments, the inventory module 608 includes a database of information about vehicles on a dealer's lot, including the stock number, the model year, the make, the model, the exterior color, the vehicle identification number (VIN), the location, the inventory age, the status, the asking price, the inventory cost, the mileage, one or more pictures, and/or one or more expenses associated with a vehicle. Other information in the inventory database can include the wholesale price, the normal asking price, the minimum asking price, asking terms, the pack fee, the type of vehicle, the body style, the interior color, the transmission, the drive type, the engine, the fuel, the vehicle weight, the vehicle condition, the recovery device type or identifier, the plate number, the plate expiration date, the inspection expiration data, additional notes, one or more valuations associated with the vehicle, and so forth.

In some embodiments, the inventory module 608 interfaces with one or more third-party systems to obtain or report data. For example, the inventory module 608 can be configured to obtain vehicle valuation information from one or more price book services 616. The inventory module 608 can also be configured to provide inventory information to a retail listing service 618. Examples of retail listing services 618 to which the inventory module 608 may be linked include, without limitation, a dealer's Web site (such as a Web site hosted by the management server 102), the AUTOTRADER.COM® retail listing service, and the CARS.COM® retail listing service. The inventory module 608 can be configured to provide real-time inventory information or periodically updated inventory information to one or more retail listing services 618. The inventory module 608 can include an interface to one or more retail listing services 618 that creates a retail listing customized for a particular service. The inventory module 608 can also be configured to automatically purchase supplemental advertising from a retail listing service 618 according to a schedule specified by a dealer. For example, in some embodiments, the inventory module 608 can create a customized advertisement for a product in a dealer's inventory and place the customized advertisement in a listing service such as EBAY® after the product fails to sell within a specified period of time. After the dealer selects an advertising schedule, the creation, purchase, and/or placement of supplemental advertisements can be automatic.

In one embodiment, the deals module 610 includes a repository of information relating to negotiated vehicle purchase agreements between a dealer and its customers. For example, the deals module 610 can maintain a list of pending and/or completed vehicle sales transactions, including financing details, if applicable. The list of transactions can include information such as, for example, the deal date, a deal identifier, a customer name, a credit score, one or more vehicles, a deal type identifier, one or more lender names, one or more deal status identifiers, one or more financing decision dates, one or more notes about the deal, information about credit applicants, employment information, credit information, customer contact information, or a combination of such information. The deals module 610 can also be configured to retain information about previous loan applications and/or sales transactions. In some embodiments, the deals module can send information to and/or receive information from third party systems such as, for example, one or more credit polling services. Credit polling services 622 can generally supply information about a customer's credit history and/or credit score. Examples of credit polling services 622 include, without limitation, Equifax® and Credco®.

In one embodiment, the administration module 612 includes settings and information pertaining to a dealer's use of the sales management system and/or the management server 102. For example, the administration module 612 can store information about users of the sales management system and suppliers (sometimes referred to as channels, for example) of products offered through the sales management system. The administration module 612 can also maintain associations between users and dealerships, dealerships and custom forms and documents, dealerships and lenders, and other associations between parties such as dealers, users, lenders, and third-party service providers.

In one embodiment, the services module 614 includes functionality for faxing, sending e-mail, printing, and transmitting information in one or more formats. For example, the services module 614 can be configured to periodically or sporadically transmit customer credit experiences to a credit reporting service 626. The credit reporting service 626 can be, for example, an interface to credit reporting software such as METRO 2. As another example, the services module can be configured to interface with a provider 624 of contracts and/or documents such as LAW Printing or Burrell Printing. The contracts and documents provider 624 can supply up-to-date loan forms and regulatory information to the services module 614.

In one embodiment, the services module 614 also includes support for sending and receiving communications between the management server 102 and other systems, such as the lender system 108 and an escrow entity 110. For example, the services module 614 can be configured to receive signals or messages from the escrow entity 110 that provide instructions for updating the inventory module 608. The services module 614 can support communications that place via a communications network (for example, via HTTP or via e-mail), via fax, via regular mail, or via another suitable delivery medium.

In one embodiment, the notes receivable module 630 contains functionality for automating the creation of invoices, past due payment notices, and debt settlement records. In some embodiments, the notes receivable module 630 includes functionality for building and viewing account servicing queues, such as, for example, queues for accounts in various stages of delinquency or accounts with collateral insurance problems. The notes receivable module 630 can also include a collection transactions reporting tool that displays reports of collection activity during a selected time period. In some embodiments, the collection activity can be sorted into collection activity by collector, by cashier, and by branch. The notes receivable module 630 can also interface with a payment protection client module 722 (FIG. 24) to provide tracking of collateral to assist in asset recovery. The notes receivable module 630 can also report collector statistics, including calls made, calls taken, payment promises procured, the value of payment promises, insurance promises, repossessions placed, repossessions cancelled, letters sent, notes, average time spent per account, maximum time spend on an account, minimum time spent on an account, and other suitable collector statistics.

b. Lender Management System (LMS) Component 606

The management server 102 shown in FIG. 23 includes an LMS component 606 (also referred to as a lender management module). In some embodiments, the deals module 610 includes an interface to the LMS component 606 of the management server 102. In one embodiment, shown in FIG. 23, the deals module 610 submits loan application information to the LMS component 606. The LMS component 606 can include data connections to, for example, one or more lender systems 108, escrow entities 110, and/or vehicle history services 620. Escrow entity 110 with which the LMS component 606 can interface include, without limitation, an online escrow service such as ESCROW.COM™, provided by Escrow.com, Inc. of Irvine, Calif. Vehicle history services 620 with which the LMS component 606 can interface include, without limitation, a vehicle history reporting service such as CARFAX®, provided by CARFAX, Inc. Communications between the LMS component 606 and one or more of the lender systems 108, the escrow entity 110, or the vehicle history services 620 can occur, for example, via a communications network 104, via fax, or via another suitable communications medium.

In some embodiments, the LMS component 610 includes functionality for handling processing of dealer-provided loans (also known as buy-here-pay-here loans or dealer financing), wholesale-purchase loans, local lender-provided loans, loans from lenders having an established relationship with a provider of the sales management system 100, loans from lenders not having an established relationship with a provider of the sales management system 100, and/or cash deals. Handling of cash deals and other deals may include procurement of a short-term loan or note for the dealer and/or customer. For example, a financing deal or cash deal may involve one or more deferred payments, a deferred down payment, or another custom financing plan that includes the use of short-term financial instruments.

In some embodiments, the LMS component compares a loan application for a customer can to a lender scorecard containing criteria for identifying lenders that would be willing to consider the loan application. In some embodiments, the LMS component 610 sends the results of the scorecard comparison, including matched lenders, to the dealer system so that the dealer and/or customer can select one or more lenders to which the loan application will be sent. In alternative embodiments, the LMS component 610 selects a subset of the matched lenders to increase the probability that at least one of the matched lenders approves the customer's loan application. For example, the LMS component 610 can select a number (such as less than six, between two and five, or another number) or a percentage (such as not more than 20%, between 5% and 20%, less than about 10%, or another percentage) of matched lenders using, for example, data from previous loan application experiences. Data from previous loan application experiences can include the ratio of applications funded by a lender to applications considered by the lender, the ratio of applications funded by a lender to applications approved by the lender, or the ratio of applications approved by a lender to applications considered by the lender. In alternative embodiments, the LMS component 610 selects a subset of the matched lenders to spread funding opportunities to seldom-used lenders in order to maintain relationships with a greater variety of lenders. In some embodiments, the LMS component 606 submits a customer's loan application to one or more lenders, such as three, four, or five lenders for consideration. In some embodiments, the LMS component 606 requests and/or receives loan application status information from the lender systems 108. Loan application status information can be sent to the deals module 610 as a loan response. For example, the loan response or lender decision can be sent in response to a loan application transmittal or customer request.

c. Other Management Server 102 Modules

Figure 24:
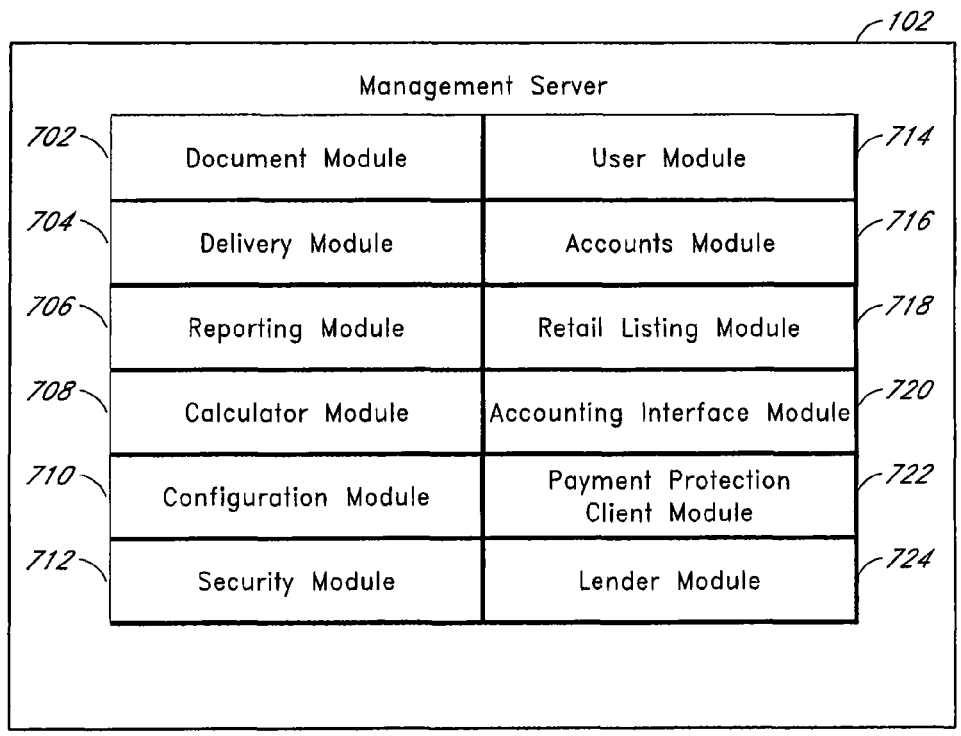
FIG. 24 is a block diagram of one embodiment of a management server including software modules for implementing at least some features of a sales management system.

FIG. 24 is a block diagram of one embodiment of a management server including other software modules for implementing several features of a sales management system. The illustrated embodiment of the management server 102 includes software modules for performing a wide variety of functions and tasks. Modules operating on the management server 102 can include a document module 702 that provides deal-specific batches of documents, forms, and/or third party agreements. The document module 702 can be configured to provide smart document selection. For example, in some embodiments, the document module 702 only displays and prints forms relevant to the type of deal being made.

The management server 102 can include a delivery module 704 for sending information and documents via, for example, fax (using, for example, a Global Fax Interface), e-mail, phone, text messaging, or another suitable means. The management server 102 can include a reporting module 706 that reports customer credit experiences to a credit reporting service 612. The management server 102 can include a calculator module 708 that calculates values for Regulation Z ("RegZ") disclosure requirements and/or incorporates rules to ensure that federal, state, and/or local lending laws and regulations are not violated. For example, the calculator module can ensure that document fees, interest rates, finance charges, and other fees do not fall outside the ranges permitted by state regulations. The calculator can provide an indicator to a user of the sales management system 100 that informs the user when a deal does not conform to one or more government regulations. The indicator may be updated in real time as a deal is entered.

In some embodiments, the management server 102 includes a configuration module 710 that maintains information about a dealership's relationships with vendors such as mechanics, repossessors, insurance companies, and the like. The management server 102 can also include a security module 712 that maintains settings for user security rights, file access permissions, document encryption, and so forth.

The management server 102 can also include a user module 714 that provides user access control for one or more dealerships associated with a user. For example, access control can restrict the days that a user can log in, the locations from which a user can gain access to the system, the accounts to which a user has access, and/or the reports, deals, documents, inventory, other tools, or administrative actions available to a user. In one embodiment, multiple users can be associated with a dealership, and a multiple dealerships can be associated with a user. The management server 102 can include an accounts module 716 that stores information about dealer accounts, such as, for example, cash accounts, long-term loan accounts, short-term note accounts, and so forth. In some embodiments, the management server 102 includes a retail listing module 718 that provides dealer product information to one or more retail listing services, including a dealer's Web site and/or other online services. The retail listing module 718 can be configured to list inventory automatically when it becomes available or according to a schedule. The schedule can be determined, for example, by the number of days that a product has been in a dealer's inventory. For example, a dealer may choose to list inventory on the dealer's website immediately and configure the retail listing module 718 to list a vehicle on an external service such as CARS.COM® only after the vehicle has been unsold for several days or weeks.

The management server 102 can also include an accounting interface module 720 that supports exporting information about, for example, accounts, expenses, inventory, sales, interest accrual, and/or vendors to an accounting system or bookkeeping company. Accounting systems to which the accounting interface module 720 can export data include, without limitation, QuickBooks, SAP, Dynamics GP, and other accounting software packages. The management server 102 can include a payment protection client module 722 that can display the locations of collateral on a map with the aid of a payment protection service provider 628. The payment protection service provider 628 can use global positioning system (GPS) tracking technology and GPS receivers installed in collateral vehicles to track and manage collateral. For example, some payment protection service providers 628 can provide vehicle repossession assistance or electronic vehicle disablement at the request of a lienholder. Payment protection service providers 628 include, for example, Ontime and Passtime. In one embodiment, the payment protection client module 722 displays a map showing the location(s) of collateral and/or a listing of collateral showing vehicle type, street or geographical vicinity, action(s) performed, the location(s) of action(s) performed, date(s) for which GPS tracking is requested, and other suitable information pertinent to asset recovery.

The management server 102 can include a lender module 724 that maintains lender relationship information, such as lender-specific loan application formats, underwriting standards, rate sheets, dealer finance participation incentives, loan application volume, and loan acceptance volume. The lender module 724 can assist the dealer and/or customer in selecting lenders in order to accomplish goals such as, for example, maximizing dealer profits, maximizing loan affordability, and/or spreading loan funding volume among several lenders in order to maintain lending channel relationships.

B. Dealer System 106

In one embodiment, the dealer system 106 provides remote access to the information stored in the management server 102. In one embodiment, the dealer system 106 is a PC comprising at least one each of input and output devices as well as a network interface module for communications with the management server 106. It is understood, however, that dealer system 106 and management server 102 may reside on the same physical machine, such as a PC. In such a case a network interface module may not be required as a single processor may perform the actions of both the dealer system 106 and the management system 102 and internal communications may be sufficient in such one embodiment.

In one embodiment, a user may utilize the dealer system 106 to electronically send and receive data from the management server 102, via a browser module. The dealer system 106 may send and receive data using one of any number of network protocols. In one embodiment of the invention, the request comprises a Hypertext Transfer Protocol (HTTP) request. However, it is to be appreciated that other types of network communication protocols may be used. In other embodiments, the dealer system 106 may include some or all of the programs and/or data stored on the management server 102.

1. Browser Module

In one embodiment, the dealer system 106 includes a browser module (not shown). The browser module presents information to the user such as inventory data or lender data. The browser module and/or a Web page accessible via the browser module may allow the user to request additional data, add data, delete data, and/or modify data.

The browser module may be implemented as a module that uses text, graphics, audio, video, and other media to present data and to allow interaction with the data via the communications medium. The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices and may also include software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module communicates with a set of input and output devices to receive signals from the user. It is recognized that in other embodiments, the browser module may be implemented as a general interface that does not include access to the communications medium.

2. Network Interface Module

The dealer system 106 may also include a network interface module (not shown) that communicates with the management server 102 to facilitate communication between the management server 102 and the dealer system 106 via the communications medium.

The network interface module may utilize a variety of network protocols. In one embodiment, the network interface module includes the Hypertext Transfer Protocol (HTTP). However, it is to be appreciated that other types of network communication protocols may be used.

3. Input and Output Devices

In one embodiment, the dealer system 106 communicates with a set of input and output devices. For example, the input device(s) may include a keyboard, roller ball, pen and stylus, mouse, trackball, voice recognition system, or pre-designated switches or buttons. The input device(s) may also include a touch screen associated with an output device. Textual or graphic information may be entered by the user through the input device. The output device(s) may include a speaker, a display screen, a printer, or a voice synthesizer.

It is recognized that in some embodiments, one or more of the input and output devices may be included in the dealer system. For example, the dealer system may include a built-in set of speakers and a built-in touchpad.

4. Dealer System Information

The dealer system 106 may include a conventional general purpose single-chip or multi-chip microprocessor such as a Pentium® processor, a Pentium® II processor, a Pentium® Pro processor, an xx86 processor, a Centrino® processor, an 8051 processor, a MIPS® processor, a Power PC® processor, or an ALPHA® processor. In addition, the microprocessor may be any conventional special purpose microprocessor such as a digital signal processor. Furthermore, the dealer system 106 may each be used in connection with various operating systems such as: Microsoft® Windows® 3.X, Microsoft® Windows 95, Microsoft® Windows 98, Microsoft® Windows® NT, Microsoft® XP, Microsoft® Vista, Microsoft® Windows® CE, Palm Pilot OS, OS/2, Apple® MacOS®, Disk Operating System (DOS), UNIX, Linux®, VxWorks, or IBM® OS/2®, Sun OS, Solaris OS, IRIX OS operating systems, and so forth.

In one embodiment, the dealer system 106 is a personal computer, a laptop computer, a Blackberry® device, a portable computing device, a server, a computer workstation, a local area network of individual computers, an interactive kiosk, a personal digital assistant, a cellular phone, an interactive wireless communications device, a handheld computer, an embedded computing device, or the like.

As can be appreciated by one of ordinary skill in the art, the dealer system 106 may include various sub-routines, procedures, definitional statements, and macros. Each of the foregoing modules are typically separately compiled and linked into a single executable program. However, it is to be appreciated by one of ordinary skill in the art that the processes that are performed by selected ones of the modules may be arbitrarily redistributed to one of the other modules, combined together in a single module, made available in a shareable dynamic link library, or partitioned in any other logical way. For example, in one embodiment of the invention, the browser module and the network interface module are integrated into a single executable module. Furthermore, for example, in another embodiment, the browser module is maintained in a dynamic link library that is separate from the network interface module. In addition, the browser module and the network interface module may be either an "application program," reside as part of the operating system for the device, or can reside partly in both.

C. Lender System 108

In one embodiment, the lender system 108 provides remote access to the information stored in the management server 102. It may be comprised of the same or a similar make-up and have the same or similar functionality as the dealer system 106. In one embodiment, the lender system 108 is a PC comprising at least one each of input and output devices as well as a network access module for communications with the management server 108. It is understood, however, that lender system 108 and management server 102 may reside on the same physical machine, such as a PC. In such a case a network access module may not be required as a single processor may perform the actions of both the lender system 108 and the management system 102 and internal communications may be sufficient in such one embodiment.

In one embodiment, a user may utilize the lender system 108 to electronically send and receive data from the management server 102, via a browser module. The lender system 108 may send and receive data using one of any number of network protocols. In one embodiment of the invention, the request comprises a Hypertext Transfer Protocol (HTTP) request. However, it is to be appreciated that other types of network communication protocols may be used. In other embodiments, the lender system 108 may include some or all of the programs and/or data stored on the management server 102.

1. Browser Module

In one embodiment, the lender system 108 includes a browser module. The browser module presents information to the user such as inventory data or lender data. The browser module and/or a Web page accessible via the browser module may allow the user to request additional data, add data, delete data, and/or modify data.

The browser module may be implemented as a module that uses text, graphics, audio, video, and other media to present data and to allow interaction with the data via the communications medium. The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices and may also include software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module communicates with a set of input and output devices to receive signals from the user. It is recognized that in other embodiments, the browser module may be implemented as a general interface that does not include access to the communications medium.

2. Network Interface Module

The lender system 108 may also include a network interface module (not shown) that communicates with the management server 102 to facilitate communication between the management server 102 and the lender system 108 via the communications medium.

The network interface module may utilize a variety of network protocols. In one embodiment, the network interface module includes the Hypertext Transfer Protocol (HTTP). However, it is to be appreciated that other types of network communication protocols may be used.

3. Input and Output Devices

In one embodiment, the lender system 108 communicates with a set of input and output devices. For example, the input device(s) may include a keyboard, roller ball, pen and stylus, mouse, trackball, voice recognition system, or pre-designated switches or buttons. The input device(s) may also include a touch screen associated with an output device. Textual or graphic information may be entered by the user through the input device. The output device(s) may include a speaker, a display screen, a printer, or a voice synthesizer.

It is recognized that in some embodiments, one or more of the input and output devices may be included in the lender system. For example, the lender system may include a built-in set of speakers and a built-in touchpad.

4. Lender System Information

The lender system 108 may include a conventional general purpose single-chip or multi-chip microprocessor such as a Pentium® processor, a Pentium® II processor, a Pentium® Pro processor, an xx86 processor, a Centrino® processor, an 8051 processor, a MIPS® processor, a Power PC® processor, or an ALPHA® processor. In addition, the microprocessor may be any conventional special purpose microprocessor such as a digital signal processor. Furthermore, the lender system 108 may each be used in connection with various operating systems such as: Microsoft® Windows® 3.X, Microsoft® Windows 95, Microsoft® Windows 98, Microsoft® Windows® NT, Microsoft® XP, Microsoft® Windows® CE, Microsoft® Vista, Palm Pilot OS, OS/2, Apple® MacOS®, Disk Operating System (DOS), UNIX, Linux®, VxWorks, or IBM® OS/2®, Sun OS, Solaris OS, IRIX OS operating systems, and so forth.

In one embodiment, the lender system 108 is a personal computer, a laptop computer, a Blackberry® device, a portable computing device, a server, a computer workstation, a local area network of individual computers, an interactive kiosk, a personal digital assistant, a cellular phone an interactive wireless communications device, a handheld computer, an embedded computing device, or the like.

As can be appreciated by one of ordinary skill in the art, the lender system 108 may include various sub-routines, procedures, definitional statements, and macros. Each of the foregoing modules are typically separately compiled and linked into a single executable program. However, it is to be appreciated by one of ordinary skill in the art that the processes that are performed by selected ones of the modules may be arbitrarily redistributed to one of the other modules, combined together in a single module, made available in a shareable dynamic link library, or partitioned in any other logical way. For example, in one embodiment of the invention, the browser module and the network interface module are integrated into a single executable module. Furthermore, for example, in another embodiment, the browser module is maintained in a dynamic link library that is separate from the network interface module. In addition, the browser module and the network interface module may be either an "application program," reside as part of the operating system for the device, or can reside partly in both.

D. Communications Networks

In one embodiment, the management server 120 communicates with the dealer system 130 and the lender system 140 via communications network(s) 104.

The communications network(s) 104 may include any type of electronic connection(s) among a group of computers including, for instance, one or more the following networks: a virtual private network, a public Internet, a private Internet, a secure Internet, a private network, a public network, a value-added network, a wired network, a wireless network, an intranet, and the like. In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). The communications network(s) 104 may connect to the management server 102, the dealer system 106, and/or the lender system 108, for example, by use of a modem or by use of a network interface card that resides in each of the systems.

In addition, the same or different communications network(s) 104 may be used to facilitate communication between the management server 102 and the dealer system 106 and between the management server 102 and the lender system 108.

IV. Sales Management Methods

In one embodiment, the management server 102 includes a credit application process, a dealer confirmation process, and a lender confirmation process.

A. Credit Application Process

Figure 20:
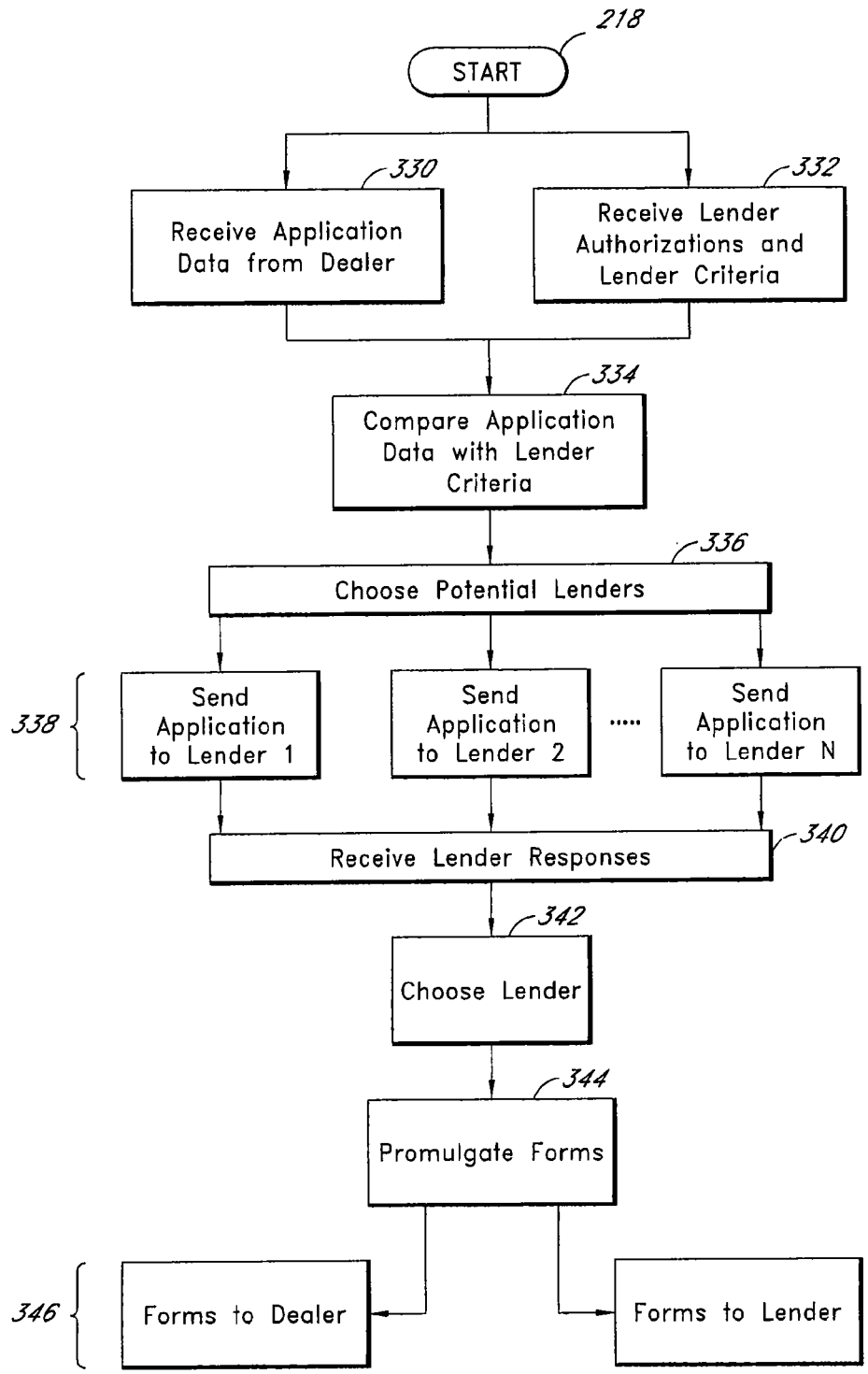
FIG. 20 is a flow chart of one embodiment of a method for processing a loan application.

In one embodiment, the credit application process determines a buyer-loan match, as shown in FIG. 20. The credit application process gathers data about a potential buyer (via the dealer) 330 and lender criteria 332. The customer data preferably includes, buyer ID, credit score, income information, credit history, and amount of credit required. The lender criteria may include authorizing a dealer and credit score or credit history data representing absolute threshold requirements. The process then compares the lender criteria and the application data to determine if the lender would even consider awarding credit 334 to the potential buyer. From the set of lenders who will consider the credit application, the process chooses a number N of potential lenders 336. The number N is preferably of a number high enough to have a reasonable probability that at least one of the lenders will accept the credit application, but not so high that lenders would routinely miss out on awarding credit that they would typically accept. In some embodiments, N is fixed whereas in other embodiments, N varies. In a preferred embodiment, N is around 5. Once the potential lenders are chosen, the application data is sent to each of the potential lenders 338.

At this point, the lenders may review the application to determine whether they wish to extend credit to the buyer/credit applicant. The process receives the lender responses 340 and presents the accepting lenders to the dealer to choose the ultimate lender 342. Once the lender is chosen, the process may utilize the gathered application data and lender data to promulgate the forms required to complete the credit transaction 344. In 346, copies of the requisite forms are distributed to the dealer and the lender.

B. Dealer Confirmation Process

Figure 21:
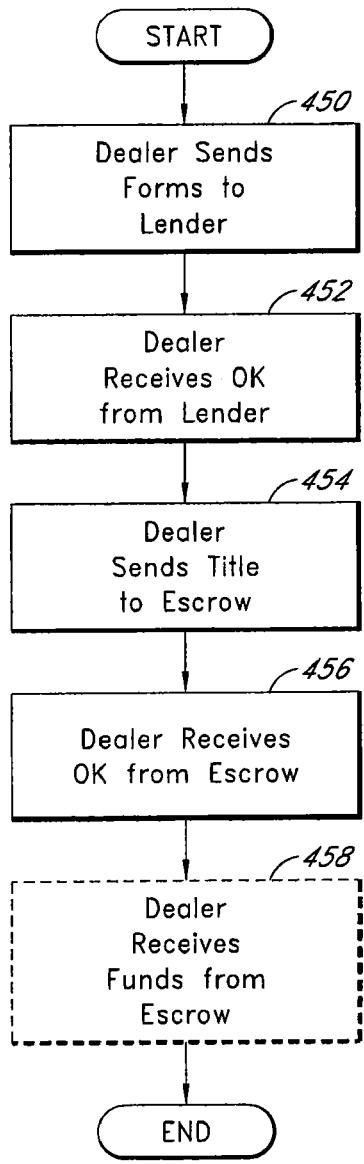
FIG. 21 is a flow chart of one embodiment of a method for a dealer to use an escrow service for a loan application.

In one embodiment, a dealer confirmation process begins when the credit application process described with reference to FIG. 20 ends. In the embodiment of the dealer confirmation method shown in FIG. 21, the dealer takes the forms that it has received from the management server 120, finalizes the forms with the help of the buyer and sends the forms to the lender 450. When the dealer receives approval from the lender 452, the dealer responds by sending the title to the escrow module or entity 110 (454). In some embodiments, the dealer sends electronic title to the escrow entity 110. The dealer then waits for an approval from the escrow entity 110 that the lender has submitted the funds and title and registration have been updated 456. In 458, the dealer then receives the funds distributed from the escrow entity 110 to complete the credit purchasing from the dealer's perspective.

In one embodiment, the dealer confirmation process is automated such that information among the management server 102, the dealer system 106, the lender system 108, and/or the escrow module or entity 110 is automatically sent using, for example, digital signatures, electronic fund transfers, and so forth. In some embodiments, a certificate authority (CA) for electronic title such as, for example, a government division of motor vehicles (DMV) establishes trust among the dealer system 106, the escrow entity 110, and the lender system 108 through a private key/public key infrastructure. In one embodiment, a CA issues a certificate to an entity on a network after verifying the identity of the entity. The certificate can contain an identifier for the entity and a public key belonging to the entity. The public key can be used to authenticate that a communication is signed with a private key of the entity and has originated from the entity. The private key is mathematically related to the public key. In order to provide some degree of confidence that a particular certificate is valid, the certificate is signed with the private key of the CA so that other entities can use the public key of the CA to verify that the certificate has been signed by the CA. The fact that the certificate has been signed by the CA indicates that the CA has verified that the certificate belongs to a trusted party. In some embodiments, a verified certificate accompanies the electronic title sent from the dealer system 106 to the escrow entity 110. Thus, the public key/private key system provides a level of security for electronic title transfers.

C. Lender Confirmation Process

Figure 22:
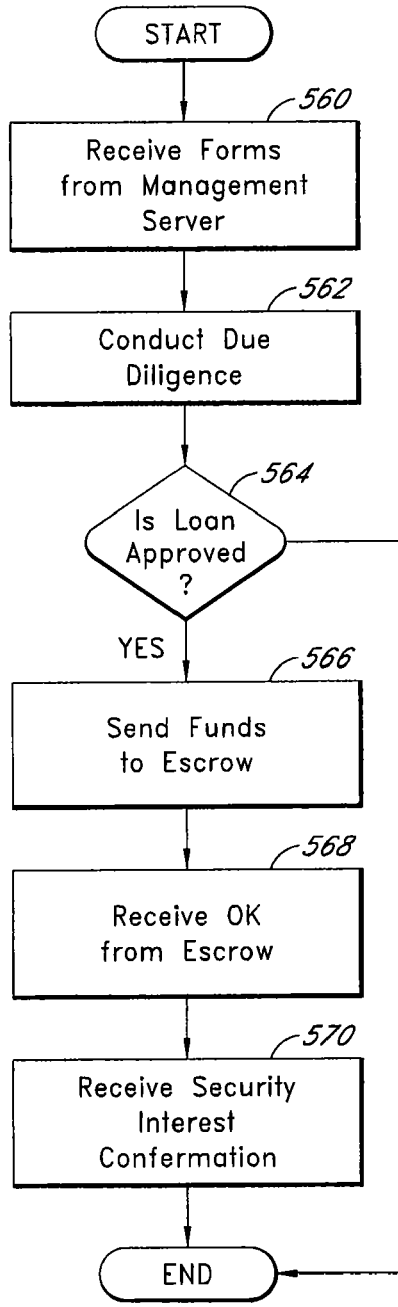
FIG. 22 is a flow chart of one embodiment of a method for a lender using an escrow service for a loan application.

In one embodiment shown in FIG. 22, the lender confirmation process begins at 560 with receiving a copy of the forms from the management server 120. At this point, the lender has the option to confirm that the buyer is who he/she says he/she is and that the data submitted by the buyer and dealer is accurate by conducting its own due diligence 562. In some embodiments, all or part of the due diligence is automated. This is not required to obtain the functionality of the system. However, a recommended embodiment includes verification of such data in order to reduce risk that the lender has been deceived by fraud. Upon satisfaction with the due diligence results, the lender will approve the loan 564 and send the funds to an escrow entity in 566. If the application fails the due diligence of 562, the lender can deny the loan, break off the transaction, and end the process. Assuming that the lender has approved and sent the funds to escrow, the lender waits to receive confirmation that the dealer has provided title, registration, and/or other relevant documentation 568 and confirmed the lender's security interest in the title to the car 570.

In one embodiment, the lender confirmation process is automated such that information among the management server 102, the dealer system 106, the lender system 108, and/or the escrow module or entity 110 is automatically sent using, for example, digital signatures, electronic fund transfers, and so forth.

Furthermore, in one embodiment, the credit application process is includes automatic interaction with the dealer confirmation process, the lender confirmation process, the escrow module or entity 110, and the third party entities. In addition, in one embodiment, the process may include a certified electronic vault where authorized documents are stored. The credit application process could then authenticate the documents as having been signed by the parties in the transaction, including for example, the lender, dealer, buyer, warranty company, insurance company, and so forth. Thus, in one embodiment, the credit application process may be considered a paperless loan. For example, in one embodiment, the entire process is automatic, using electronic documents and forms from the moment a dealer begins typing up an application to the moment that title and funds are released from escrow, including, for example, registration with the DMV, payment of state and/or local taxes, payment of pre-existing liens, and so forth.

While the above figures illustrate embodiments of the flow charts, it is recognized that in other embodiments, other flow charts may be used. In addition, some of the items may be performed at least partly in parallel or at least partly in serial.

IV. Sample Operation

For purposes of illustration, a sample scenario will now be discussed in which the systems and methods are used in operation. In this sample scenario, the system is used by a used auto dealer to process a loan application via an Internet Web site.

Figure 2:
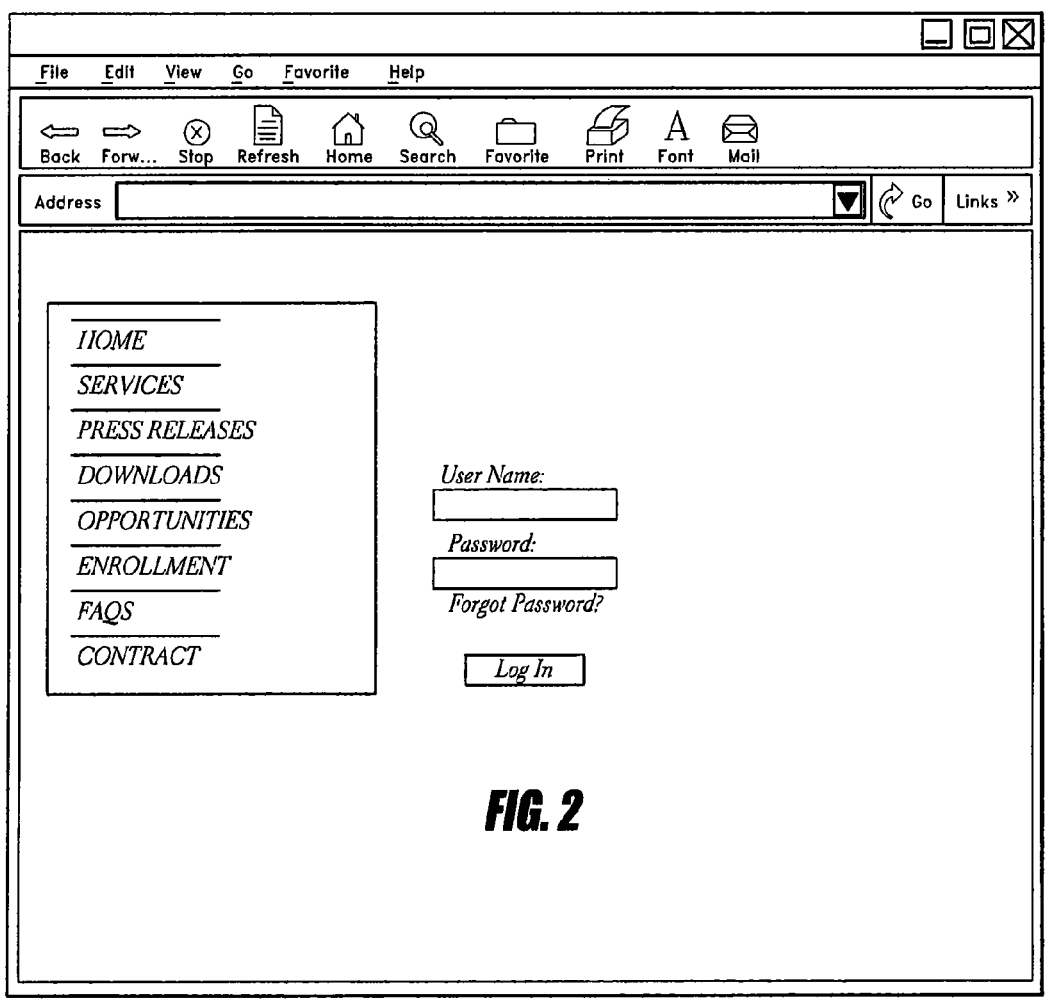
FIG. 2 illustrates one embodiment of a total sales management system Log-in Page.

In one embodiment, the management server runs a program or system referred to in the embodiments shown in the figures as Finance Express or FEX. In one embodiment, this program provides a service capable of contracting with and becoming the primary management system for thousands of independent auto dealerships across the United States and potentially throughout the world. The program commences when the car dealer uses his or her dealer system 106 to log onto the management server 102. The system is preferably password and ID protected. In one embodiment, the program issues qualified dealers an access password and ID for free and commences charging the dealers only when they are fully activated on the system. One embodiment of a screen shot of such a log-in page is shown in FIG. 2.

Upon being granted access to the system, the dealer will see a Home Page such the embodiment shown in FIG. 3A. As shown, there is a row of tabs near the top of the page corresponding to the various aspects of the system via Web pages or screens, such as "Apps" to access and manage credit applications and "Inventory" to view and manage the dealer's personal car inventory. Each tab will be described in more detail herein. At this point, the dealer can start a new credit application for a car buyer, review the status of current applications in process, view management reports, apply to sign up with new lenders on the system, and so forth.

An alternative embodiment of a Home Page is shown in FIG. 3B. The Home Page illustrated in FIG. 3B provides the user with a snapshot of the total value of sales for the day, the dealership inventory, and information about accounts receivable, past due accounts, and a transaction summary. The embodiment of the Home Page shown in FIG. 3B is adapted for a dealership that offers dealer financing of the cars that it sells (for example, a "buy-here, pay-here" dealer). In some embodiments of a sales management system, a user can select the format of the Home Page shown after being granted access to the system. For example, at least some users can be given the ability to select a Home Page similar to the one shown in FIG. 3A, a Home Page similar to the one shown in FIG. 3B, or another suitable Home Page format.

Users who select a buy-here, pay-here (BHPH) dealer Home Page can also be provided with an alternative interface that allows access to various other BHPH dealer -relevant features, such as, for example, those provided by the notes receivable module 630. The notes receivable module 630 can be configured to track and manage a BHPH dealer's debt collection efforts.

One embodiment of a Notes Receivable Page is shown in FIG. 25. In one embodiment, the notes receivable page includes functionality for looking up customer accounts. For example, a customer accounts database can be searched by last name, first name, social security number, phone number, loan number, account number, stock number, vehicle identification number (VIN), or by another suitable identifier. An account lookup module returns a listing summarizing outstanding, retired, and defaulted notes. The listing can include the borrower name, the loan and/or account numbers, the stock and/or plate numbers, the vehicle type and/or VIN, the account status, the account tier, the number of days that the account is past due, the account balance, and other relevant account details. One or more interface elements such as buttons may be provided in the listing for adding notes to customer accounts and performing actions, such as posting a payment, on customer accounts.

Figure 4:
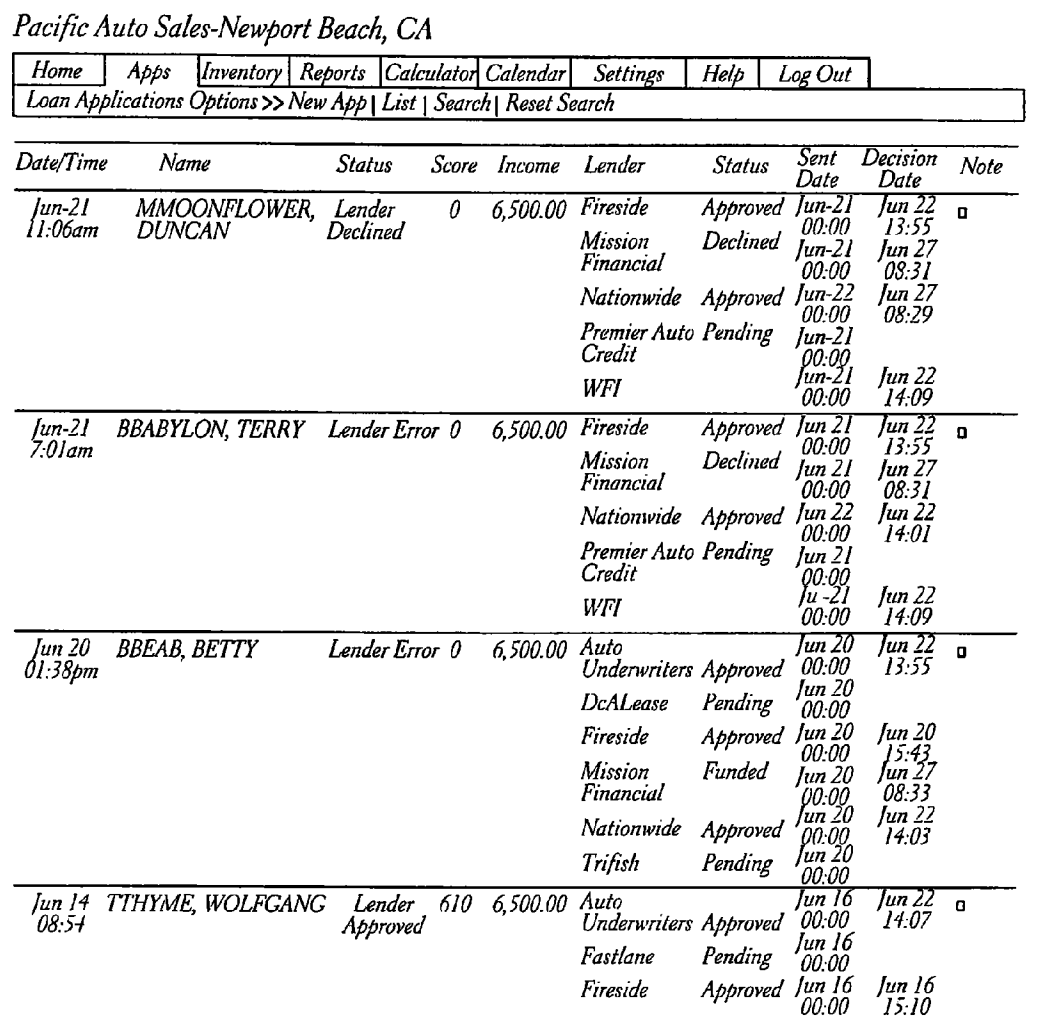

By selecting an interface element such as an "Apps" tab or, alternatively, a "Deals" tab, the dealer is taken to a screen such as the embodiment shown in FIG. 4. This page shows a list of all the dealer's loan applications and their status. In some embodiments, the page also shows a list of other varieties of deals that are pending or completed, including cash deals. In one embodiment, by selecting "New App" the dealer is directed to a page such as pictured in FIG. 5A. Here, the dealer can enter information about a new applicant for credit and submit that information to obtain a credit report.

Figure 5B:
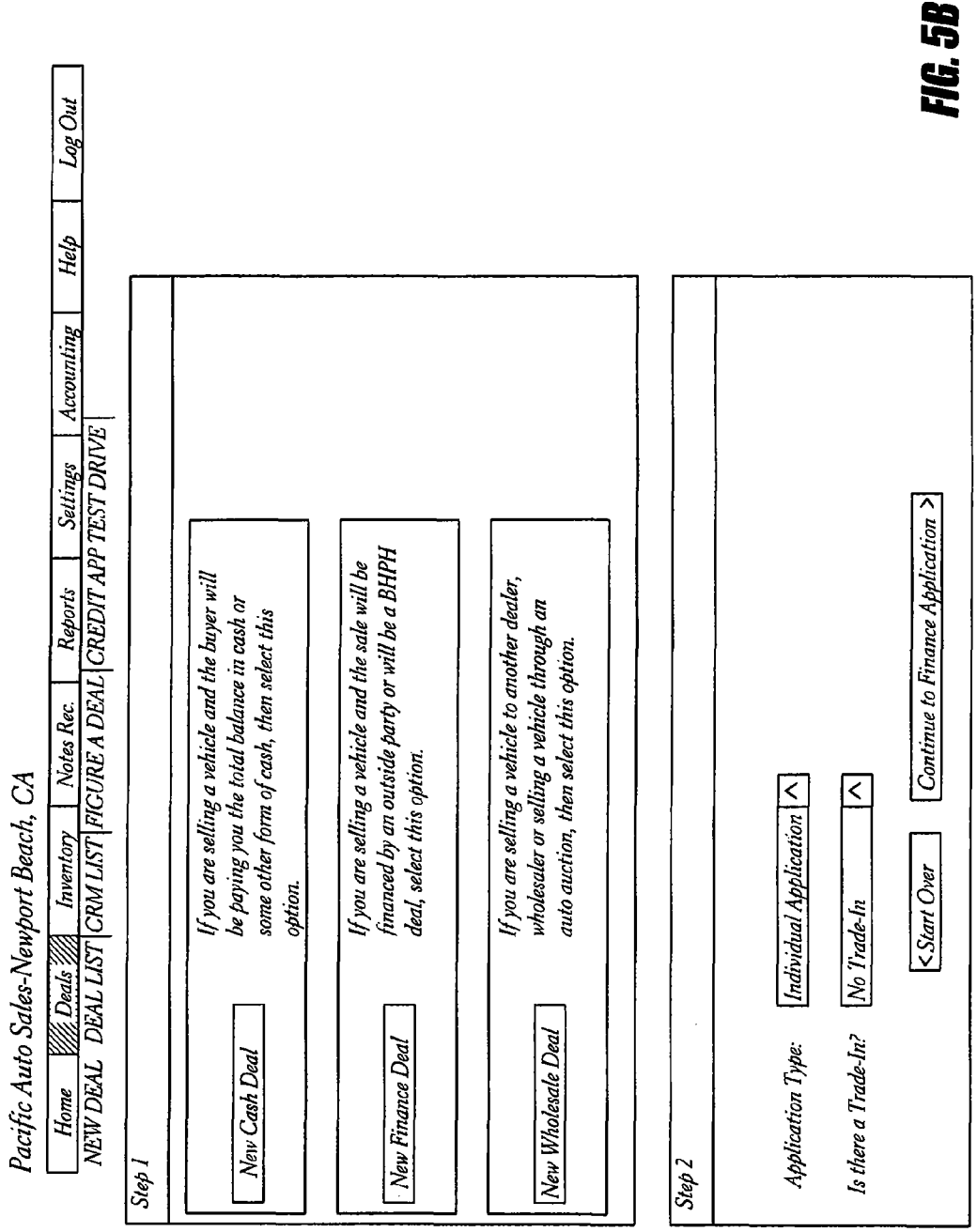
FIG. 5B illustrates one embodiment of a New Deal Page.

In an alternative embodiment, the dealer can select a "New Deal" interface element such as the one shown in FIG. 5B. The embodiment shown in FIG. 5B allows the dealer to select the type of deal that the dealer wishes to start. The sales management system can select worksheets and forms for the dealer to complete that are tailored to the type of deal selected. For example, the dealer can be presented with a screen as shown in FIG. 5B, from which the dealer can select a new cash deal, a new finance deal, or a new wholesale deal. Depending on the type of deal selected, the sales management system may present additional questions to further customize the information requested to complete a deal. For example, the sales management system may ask whether a deal will involve one or more purchasers. Information about a vehicle trade-in could also be requested. Before continuing to the purchase application, the sales management system may also allow the user to look up a customer by name or Social Security number in a customer database 218 (FIG. 19). If a matching customer record is found, information already in the database may be inserted into a purchase application automatically. If the new deal is a finance deal, the user may be directed to a page such as pictured in FIG. 5A to enter purchase application information. The purchase application shown may be customized to fit the type of deal and may also include validation indicators that show what required information must be entered and/or identify potential errors in the application.

Once a credit report is retrieved, the dealer can select the Application "Credit" tab to access credit report information, as illustrated in the embodiment shown in FIG. 6. FIG. 7 shows one embodiment of an employment information ("Emp Info") page that allows the entry of employment information. If there is going to be a co-signer on the loan, the dealer selects the "Co Info" tab and enter the information on the co-signer much as the applicant information was entered in FIG. 5A. In some embodiments, the "Emp Info" page is customized to selectively hide co-borrower information fields depending on previous deal information provided by the user. The "Trade In" page allows the dealer to enter information about any potential trade-in from the purchaser as illustrated in the embodiment shown in FIG. 8. The "Trade In" page may not be shown if the user has previously indicated that no trade-in is included in the deal.

Figure 9:
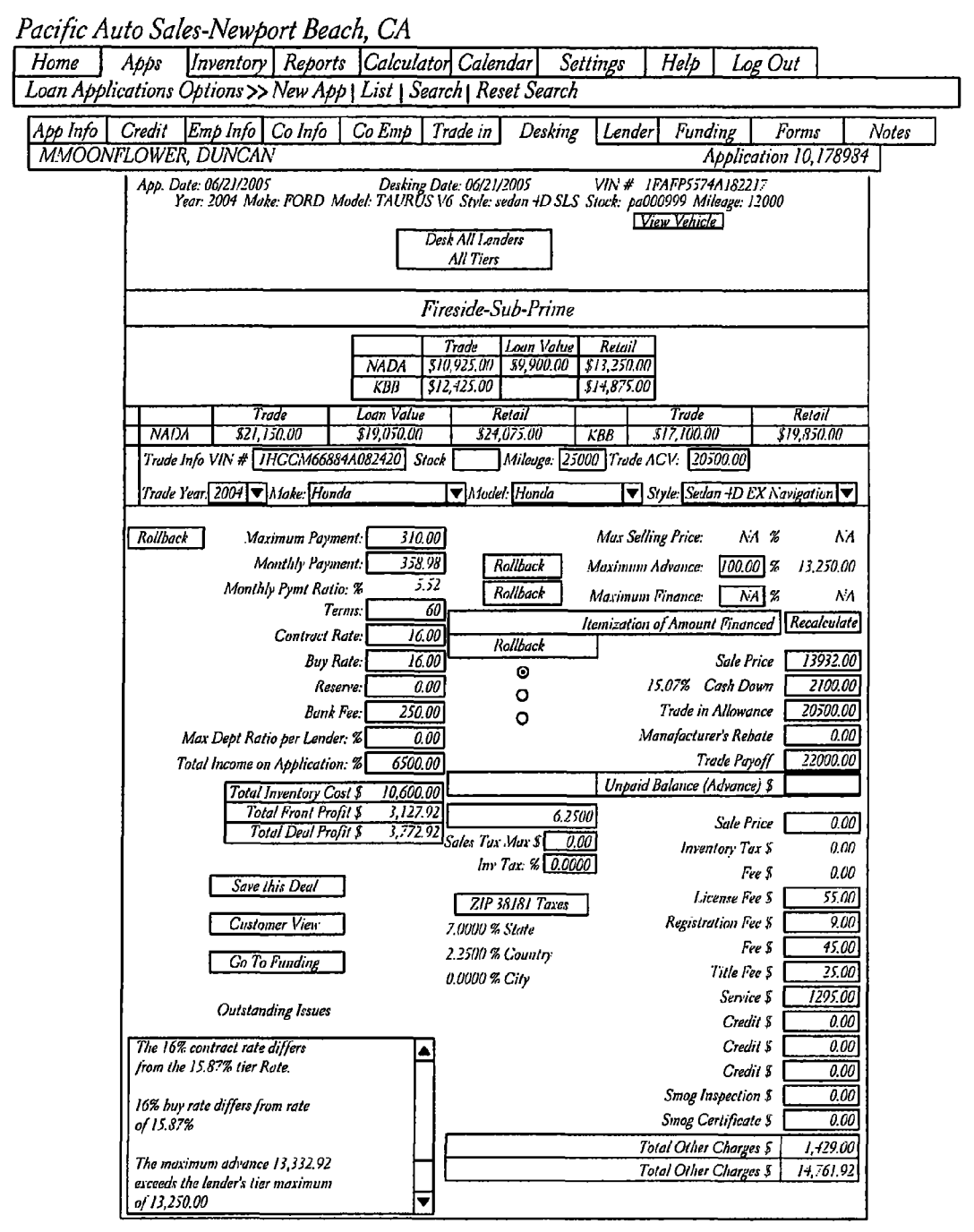

Once the information is entered, the "Desking" page (or worksheet) shows the available lending opportunities based upon the buyer's information, including, for example, credit data, cars in the dealer's inventory, and available loan programs as illustrated in the embodiment shown in FIG. 9. This page sorts the vehicles for which the customer qualifies and is acceptable to the lender for that customer. In addition, it compares each vehicle to the requirements of each lender's approval guidelines. It also lists the Make/Year/Model of each vehicle and the number of days the vehicle has been in the inventory. This page allows the dealer to find out what is potentially the best deal and to customize the deal structure to try to obtain that solution from the lender. The deal worksheet can also include a scratch pad for figuring various discounts or dealer reserves and vehicle information. Vehicle information can be selected, searched, or retrieved, for example, from the inventory module 608 (FIG. 24) or from another source. The deal worksheet can display a calculator for the amount to be financed, taking into consideration, for example, the contract date, the sales price, the cash down, the net trade-in value, the value of after market products, the loan rate, and the payment schedule. The calculator may calculate the amount of a periodic loan payment, Regulation Z disclosure values, total deal gross profit, net profit, and other values pertinent to the deal.

In some embodiments, a List of Deals page (not shown) indicates the vehicle selling price for one or more lenders, the customer's monthly payment, and what the interest rate (for example, the contract rate) will be for the customer. The List of Deals page can also list the buy rate in the event the lender provides the dealer a finance reserve participation. It also lists the customer's down payment. The number of days in inventory is displayed, allowing the Dealer to manage the aging of the inventory. For example, the Dealer may choose to adjust the terms of sale, such as the selling price, for vehicles that have been inventory a large number of days. The Dealer may wish to sell a vehicle that has been in inventory for an extended period of time, and accept a lower amount of profit than for a vehicle that was recently purchased from an auction. In one embodiment, the selling price begins with the maximum selling price, so that every transaction can be compared relative to its maximum potential sales price. The monthly payment indicated is based upon these maximum selling prices.

Once a dealer selects the best deal, the dealer may begin structuring the deal by selecting a user interface element associated with the desired deal such as a "Deal" button or a "View" button. This loads the selected vehicle into the desking tool or worksheet as the desired vehicle for the customer.

After a vehicle has been selected and the dealer wants additional information regarding the selected vehicle, the dealer may press the "View Vehicle" button which will immediately display the information for that particular vehicle, as entered into the inventory record.

In one embodiment, the Desking page includes an electronic four square. The four square includes the Sale Price, the Monthly Payment, the Trade-in Allowance, and the Cash Down payment. This section of the system provides the ability to manipulate or change the values of these four components with the click of a rollback button. By selecting a given lender (within "Select all Lenders all Tiers"), the system automatically loads the lender's Maximum Advance rate percentage into the four square. The system also enters lenders acceptable Term, Contract Rate, and Buy Rate. The dealer can then enter the amount of the customer's cash down payment and fill in the trade-in allowance given on the customer's car.

The dealer can also enter the maximum monthly payment that the customer is willing to pay into the "Maximum Payment" box located above the green "Monthly Payment" box. Highlighting the small round "rollback" button to the left of the Sale Price box determines what the sales price needs to be in order to obtain the maximum monthly payment. Selecting this option adjusts the calculations based upon the amount that was entered in the Cash Down field. The third "rollback" calculates the transaction based upon the given Trade-in Allowance. In this way, the entire transaction may be repeatedly re-calculated using different values for the various criteria.

The lower left section of the Desking Page includes a check box that is labeled "Customer View." Selecting this check box changes the view on the screen to only that information that is related to the customer. In other words, the information that is related to the dealer (such as profit) is hidden from view.

The bottom of page includes an Outstanding Issues box. This box informs the dealer if there is a problem with the deal structure. If the dealer does something that is outside of the lender's approved program, the box will turn bright red. This indicates that there is a problem, and at the same time, the issue will be detailed in the Outstanding Issue box, indicating what can be done to correct the problem. For example, Lender A may approve a loan to Mary Smith for 115% of the wholesale price. The dealer may type in the form that the loan is for $3500, which is 118% of the wholesale price. When the dealer attempts to save the form or exit the screen with the information, the program can then alert the dealer that the entered loan amount does not match the amount approved by the lender.

After a lender has been selected and the deal is final, the next is to select on the button in lower left corner labeled "Go to Funding." The system sends an email to the lender notifying the lender that the dealer will be sending the lender the deal according to the terms of the lender's approval. The system also selects the relevant forms from the Forms Library that are required by this lender for this particular transaction. In addition, the system creates the Funding Record or "Recap Sheet" (sometimes referred to as the "wash out sheet"), which includes accounting data for this particular transaction.

In some embodiments, the dealer can select a "Lender" tab, causing the system to display a screen such as the embodiment shown in FIGS. 10A and 10B. On the lender selection page, one or more credit applications for associated with a customer can be reviewed and selected. In one embodiment, the user can select from lenders other than the one or ones selected in the Desking page. In alternative embodiments, the lender selection process can be integrated with the deal worksheet. For example, each worksheet may be associated with a single financing package or lender.

FIG. 11 shows one embodiment of a "Funding" page. The Funding page is a transaction recap sheet for accounting purposes. The center of the page includes the Notes section, which tracks any communications between the dealer and the lender such as items needed, anticipated date of funding and open issues. This allows anyone familiar with the transaction to log in and obtain an understanding of the funding status. In addition, the captured notes can be sent to any approved lender. Thus, the approved lender will be able to see, for example, whether the dealer has incorrectly approved more than one lender, whether the dealer has "altered" any of the buyer's application data, and so forth. This information helps the lender identify possible fraudulent changes and protect the lender from dealer fraud which they otherwise might not be able to notice. In addition, it allows the lender to correct any mistakes before the final deal is made thereby increasing the likelihood that the documents are being correctly prepared and that the lender will be able to accept the final draft.

The rest of the Funding Page is divided into the various sections of the transaction, including the customer information, the vehicle sold, the trade-in information, the deal structure, the inventory detail, and a summary of the transaction.

Applications entered into the sales management system can be lender specific, allowing the lender to obtain data directly from a dealer, such as financial statements, balance sheets, inventory, and length of time in business. In one embodiment, the lender first must accept a dealer as qualified. Once a lender has done so, the dealer may immediately commence submitting applications to that lender.

In one embodiment, the system preferably processes the information and filters it against lender credit criteria to see if the customer meets a lender's loan criteria. If the customer is accepted, the system sends the application to the lender at which time it approves or declines the customer.

Preferably this process occurs in real time. In one embodiment, the information regarding all of the loans submitted by the dealer is reflected on the dealer's main interface screen of the system. At a glance, the dealer can see the status of the applications that are pending. The deal structure is completed in the desking section of the sales management system, allowing the dealer to communicate and disclose the structure of the approved loan with the customer. Once this is finalized, the dealer prints all of the forms necessary for the customer, lender and the dealer. In some embodiments, the forms can be accessed from the "Forms" tab as illustrated in the embodiment shown in FIG. 12. The forms also may be available by selecting a "Credit App" tab or by clicking a "Print Forms" button in a lender selection area. In order to refresh recollection of a given transaction, the dealer may choose to enter notes as illustrated in the embodiment shown in FIG. 13.

These notes allow the dealer to quickly reacquaint the dealer with the status of the application, loan, and transaction as a whole.

In addition, lenders may also receive copies of the forms to view draft copies of the documents the dealer would or is preparing. The lenders may use this information to help make their decisions and/or provide guidelines of how they would suggest that the dealer structure the deal. For example, Lender A may agree to the terms of the dealer as presented, but also suggest that they either go with 15.2% for 60 months instead of 48 months or any other combination between 15% and 17%. In addition, the lender may specify a buy rate which the lender wants the dealer to use, but to also allow the dealer to use a higher contract rate with the buyer. Furthermore, dealers and lenders may also allow the dealer to share in some of the profits and shared with the dealer in the Desking page (or deal worksheet). This information gives the dealer an advantage of being able to see a more accurately estimated profit for the deal that is being structured. Without this information, the dealer typically has to guess and often the dealer's guess is not accurate.

Once the dealer selects a deal, the system may then send an e-file to the lender so it has a copy of the transaction. In order to provide a more secure transaction for lenders and purchasers alike, in one embodiment, the system also sends the information to an escrow module or escrow entity 110, which initiates the process of the lien registration for the lender. The escrow module or entity 110 may be Escrow.com, or another escrow module or entity. The escrow module or entity 110 Escrow.com then completes the transaction and the DMV title process.

When the lender is ready to fund this loan, the funds are delivered to the escrow module or entity 110, instead of to the dealer. The entity module or entity 110 then holds the funds on behalf of the lender, to ensure the lender that the lien has been registered on the vehicle. When the title process is completed, the funds are released to the dealer.

In one embodiment, the sales management system utilizes electronic filings, such as electronic titles and/or liens, with a government division of motor vehicles (DMV). Use of electronic titles and liens can shorten the time in which a vehicle sale and title transfer can be completed. An electronic title is a title that exists in electronic form, for example, in a DMV database. An electronic title can be a paperless equivalent of a paper title certificate. Closely integrating the sales management system and the escrow service saves time and money for the lender, who may avoid a title follow up, and protects the lender from losses due to unreliable dealers. When the lender has accepted the final loan documents the escrow company pays off any outstanding liens on the title, pays any processing fees and/or taxes, and submits the new title application to the state.

Another aspect of one embodiment of the program that improves efficiency for the lender is the fact that the application can be sent into the lenders credit review system with a direct data interface. This cuts the cost for the lender by doing away with data input and processing requirements. In one embodiment, the approval or denial is returned to the dealer in as little as a few seconds up to a maximum of 45 minutes, for example. In one embodiment, features of the system are designed to improve the "look to book" ratio and the performance of the lender thereby providing extra incentive for the lenders to participate in the system. By limiting loan applications to those which meet a lender's criteria and/or by limiting the number of lenders that are asked for approval, for each sale, the lenders have a higher probability of getting a loan for each application they review for approval. For example, a lender is more likely to take the time to review the application if the lender knows that the application meets its criteria and that the lender is one of only five lenders competing for the loan. If the number of lenders it not limited, there may be fifty, 100, or even more lenders that receive the application, and thus a lower probability that a particular lender will get the loan.

Figure 15:
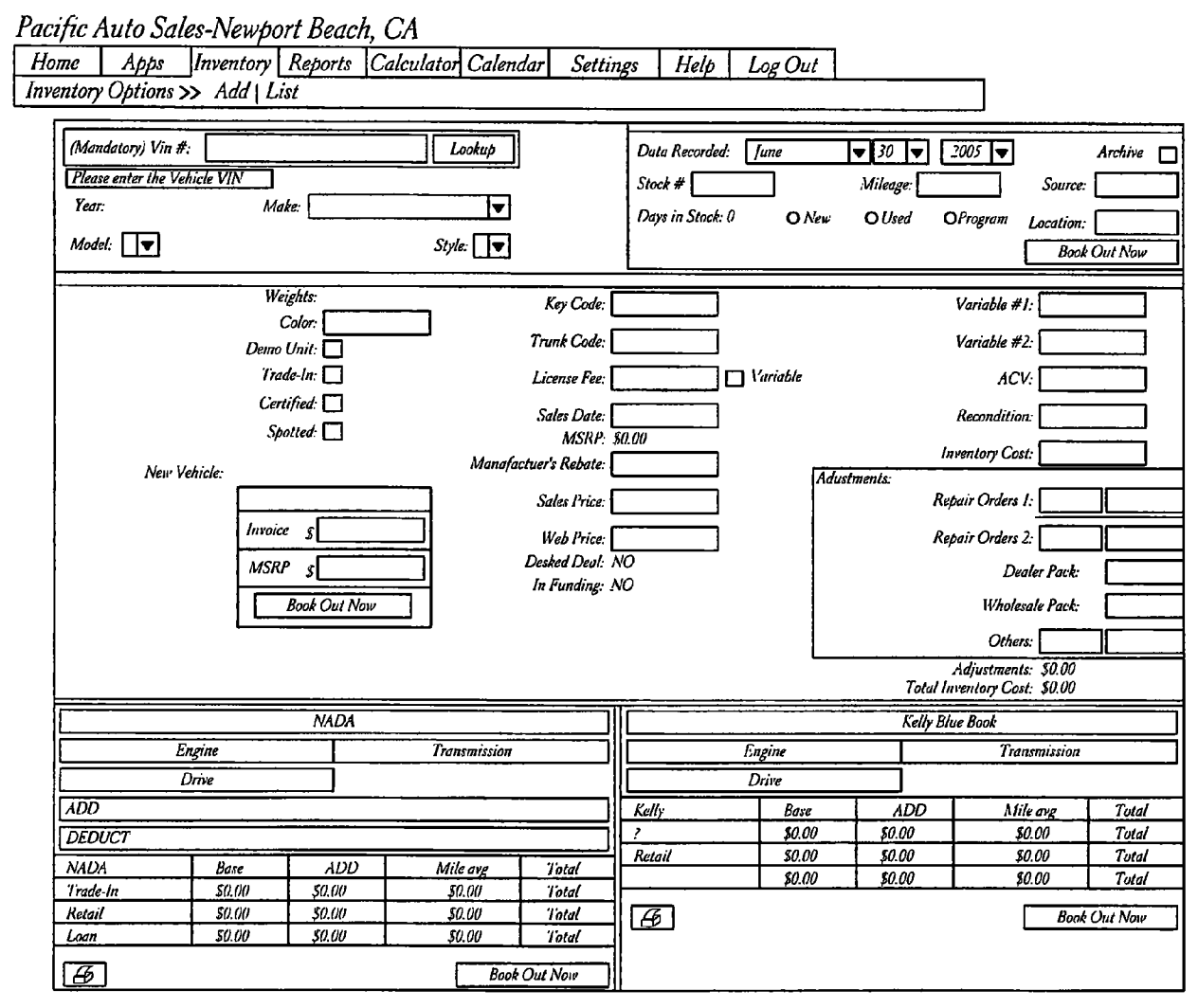

As discussed generally, one embodiment of the sales management system tracks a dealer's inventory. In some embodiments, the dealer inventory can be readily viewed by accessing the "Inventory" tab. One embodiment of a sample inventory listing is pictured in FIG. 14. In some embodiments, the dealer inventory list can also include one or more photos of the vehicles, the location of the vehicles, the age of the inventory, the status of the vehicles, or other vehicle information. In some embodiments, the user can select an "Add Expense" interface element in the inventory list to adjust the costs associated with vehicles in the inventory. FIG. 15 shows one embodiment of a screen for adding a new car to the inventory. This can be done as the user chooses a car, or preferably, the database would be updated each time the dealer purchases additional cars for sale.

Figure 18:
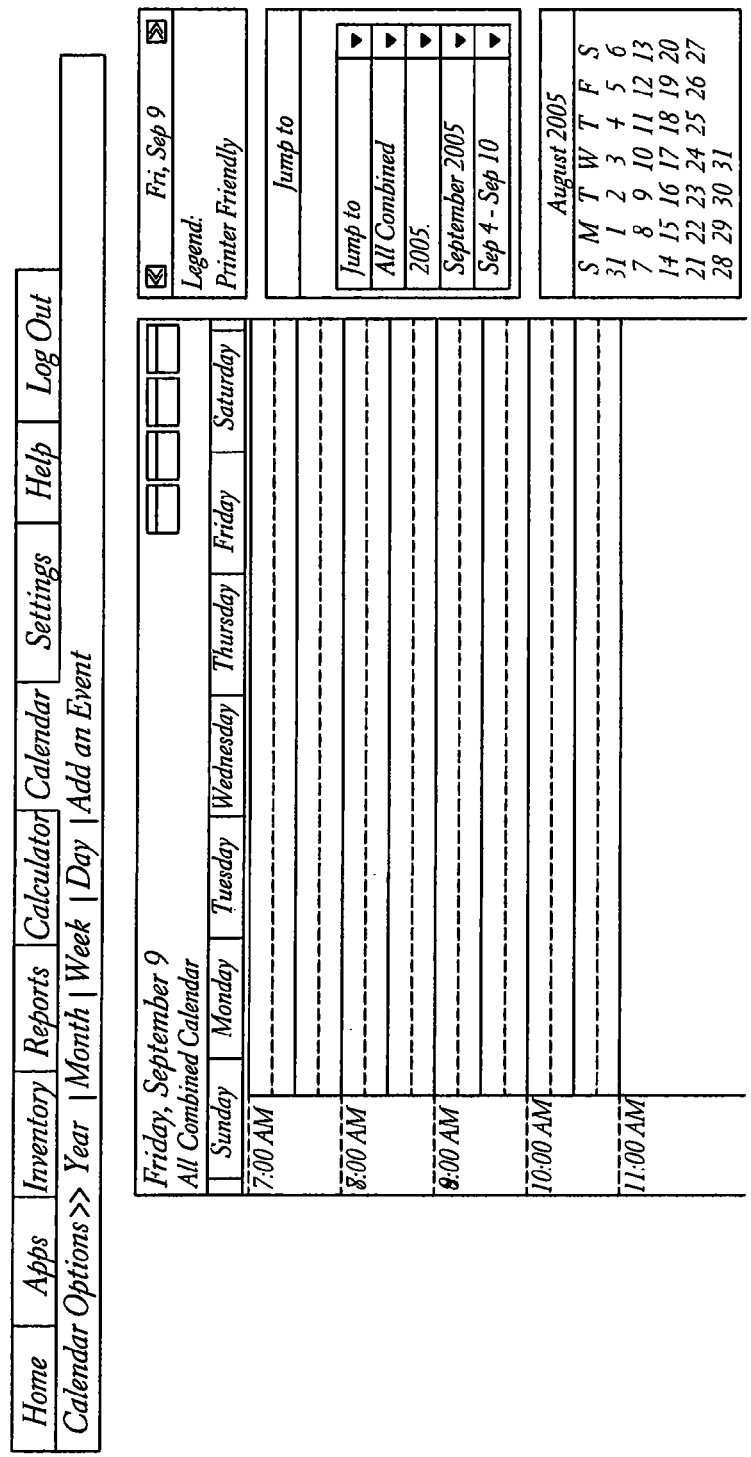
FIG. 18 illustrates one embodiment of a Calendar Page.

Additional features may also be present in the sales management system in some embodiments. For example, a Reports page can provide an easy method of obtaining pre-designed printouts of the important information processed through the system as illustrated in the embodiment shown in FIG. 16. Although most of the information needed by most dealerships is available online at any time, one or more reports may also be printed. Available reports can include, for example, inventory reports, sales reports, dealer account reports, transaction reports, accounts past due reports, sold accounts reports, general ledger reports, compliance reports, channel reports, and other reports of dealer-related activities and information. In some embodiments, reports can be archived in a repository of the sales management system, customized, and sent via fax or e-mail (for example, as an Adobe® PDF® file attachment to an e-mail message). Similarly, the sales management system may replace other devices or programs, such as calculators and calendars as illustrated in the embodiments shown in FIGS. 17 and 18, respectively. Although these features may not be required to accomplish a transaction, their inclusion aids transactions and further reduces a dealer's need to rely on other programs and/or management tools in running a dealership.

While the example above involves a used car dealer and specific embodiments of Web pages and screen shots, it is recognized that these embodiments are used only to illustrate features of various embodiments of the systems and methods. Further, the systems and methods may be used in other environments and may be used with other types of and/or combinations of loans, including, for example, car sales, home sales, rentals, and data, audio data, graphic files, multimedia data, executable data, and so forth. Additionally, a creditor may obtain a security interest against collateral other than the car to be purchased, such as for example on the buyer's house.

V. Exemplary Pricing Structures

It is recognized that a variety of pricing structures may be used with the sales management system. For example, the dealers may be charged a flat fee, a subscription fee, and/or individual fees for particular items, such as, for example, the credit reports, the printing of forms, and so forth. As another example, the lenders may be charged a flat fee, a subscription fee, and/or individual fees for particular items, such as, for example, each time they are listed as a potential lender, each time they are sent an application to review, each time they are selected as the lender, and/or each time they actually fund the loan.

VI. Additional Embodiments

Although systems and methods of the credit application process, lender confirmation process, and dealer confirmation process are disclosed with reference to preferred embodiments, the invention is not intended to be limited thereby. Rather, a skilled artisan will recognize from the disclosure herein a wide number of alternatives for the exact ordering the steps, and how the escrow module 110 is implemented.

In addition, in other embodiments, the dealer management system may include an accounting system for managing the finances of the dealer, an in-house financing system that allows the dealer to itself provide financing, a digital signature system that allows for the sending of electronic documents using digital signatures, a campaign system for sending advertisements to potential buyers, an extended services contract or warranty system that allows the dealers to manage and provide extended services internally or with third parties, a sticker system that allows the dealers to print stickers such as window stickers, a lead generation system that provide lenders and/or dealers with leads, a credit report system that access credit information of the buyers, and so forth.

It is also recognized that the term "remote" may include data, objects, devices, components, and/or modules not stored locally, that is not accessible via the local bus. Thus, remote data may include a device which is physically stored in the same room and connected to the user's device via a network. In other situations, a remote device may also be located in a separate geographic area, such as, for example, in a different location, country, and so forth.

It is recognized that the term "module" may include software that is independently executable or standalone. A module also includes program code that is not independently executable. For example, a program code module may form at least a portion of an application program, at least a portion of a linked library, at least a portion of a software component, or at least a portion of a software service. Thus, a module may not be standalone but may depend on external program code or data in the course of typical operation.

Although the foregoing invention has been described in terms of certain preferred embodiments, other embodiments will be apparent to those of ordinary skill in the art from the disclosure herein. Moreover, the described embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions and modifications will be apparent to the skilled artisan in view of the disclosure herein. Thus, the present invention is not intended to be limited by the disclosed embodiments, but is to be defined by reference to the appended claims. The accompanying claims and their equivalents are intended to cover forms or modifications as would fall within the scope and spirit of the inventions.

What is claimed is:

1. A system for helping a dealer sell a vehicle to a customer comprising:
a memory; and
a processor connected to the memory and configured to
provide an entry module permitting the entry of data relating to the customer and data relating to a proposed purchase of a vehicle by the customer from the dealer;
provide a filter module to match at least some of the customer data or the data relating to the proposed purchase with lender criteria, wherein the lender criteria are selected to identify lenders that are willing to consider providing a loan for the purchase of the vehicle;
provide a lender selection module configured to select a subset of the matched lenders that are likely to approve the loan based on previous loan application processing experience data maintained by the system to increase a probability that at least one of the matched lenders approves the loan, wherein the previous loan processing experience data includes a ratio of applications funded by one lender of the matched lenders that are willing to consider providing a loan for the purchase of the vehicle, to applications considered by the one lender; and
provide a transmission module configured to transmit the customer data to the subset of lenders, wherein the subset of the matched lenders are further selected to spread funding opportunities to less used lenders of the lenders that are willing to consider providing a loan for the purchase of the vehicle.

2. The system of claim 1 wherein the lender selection module selects between two and five of the matched lenders that are likely to approve the loan based on previous loan application processing experience data maintained by the system.

3. The system of claim 1, wherein the lender selection module selects between five percent and twenty percent of the matched lenders that are likely to approve the loan based on previous loan application processing experience of the dealer.

4. The system of claim 1, wherein the lender criteria comprise at least one of model year range of vehicles preferred by lender, a preferred make of the vehicle, previous owner history, vehicle mileage, whether the vehicle has been in an accident, and the seriousness of the accident.

5. The system of claim 1, wherein the lender criteria comprise a preferred customer credit profile.

6. The system of claim 1, wherein the lender criteria comprise a preferred range for a credit score of the customer.

7. The system of claim 1 wherein the previous loan processing experience data includes a ratio of applications funded by one lender of the lenders that are willing to consider providing a loan for the purchase of the vehicle, to applications approved by the one lender.

8. The system of claim 1 wherein the previous loan processing experience data includes a ratio of applications approved by one lender of the lenders that are willing to consider providing a loan for the purchase of the vehicle, to applications considered by the one lender.

* * * * *